United States Patent
Kobayashi et al.

(10) Patent No.: US 9,057,017 B2
(45) Date of Patent: Jun. 16, 2015

(54) LIQUID CRYSTAL COMPOSITION AND LIQUID CRYSTAL DISPLAY DEVICE

(71) Applicant: SEMICONDUCTOR ENERGY LABORATORY CO., LTD., Atsugi-shi, Kanagawa-ken (JP)

(72) Inventors: Manabu Kobayashi, Kanagawa (JP); Tetsuji Ishitani, Kanagawa (JP); Yuko Kawata, Kanagawa (JP); Tomohiro Tamura, Okinawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/677,636

(22) Filed: Nov. 15, 2012

(65) Prior Publication Data

US 2013/0126782 A1   May 23, 2013

(30) Foreign Application Priority Data

Nov. 23, 2011   (JP) ................. 2011-255621

(51) Int. Cl.
*C09K 19/20* (2006.01)
*C09K 19/12* (2006.01)
*C09K 19/34* (2006.01)
*C09K 19/54* (2006.01)
*C09K 19/30* (2006.01)
*C09K 19/02* (2006.01)
*C09K 19/58* (2006.01)

(52) U.S. Cl.
CPC ......... *C09K 19/3068* (2013.01); *C09K 19/2007* (2013.01); *C09K 19/586* (2013.01); *C09K 19/0275* (2013.01); *C09K 2019/2035* (2013.01); *C09K 2019/3083* (2013.01)

(58) Field of Classification Search
CPC ........... C09K 19/0275; C09K 19/2007; C09K 19/3068; C09K 19/38; C09K 19/586; C09K 2019/2035; C09K 2019/3083
USPC .............. 428/1.1; 252/299.01, 299.5, 299.63, 252/299.66, 299.67; 560/65
See application file for complete search history.

(56) References Cited

U.S. PATENT DOCUMENTS

| | | | |
|---|---|---|---|
| 7,576,829 B2 | 8/2009 | Kikuchi et al. | |
| 7,648,647 B2 | 1/2010 | Kikuchi et al. | |
| 7,794,621 B2 * | 9/2010 | Schott et al. | 252/299.01 |
| 8,440,102 B2 * | 5/2013 | Tamura et al. | 252/299.66 |
| 2008/0116419 A1 * | 5/2008 | Kirsch et al. | 252/299.63 |
| 2008/0259254 A1 | 10/2008 | Kikuchi et al. | |
| 2011/0253935 A1 * | 10/2011 | Jansen et al. | 252/299.61 |
| 2012/0132855 A1 | 5/2012 | Ishitani et al. | |

FOREIGN PATENT DOCUMENTS

| | | |
|---|---|---|
| JP | 2006-348226 | 12/2006 |
| JP | 2007-308534 | 11/2007 |
| JP | 2008-303381 | 12/2008 |
| WO | WO 2005/080529 A1 | 9/2005 |
| WO | WO-2005/080529 A1 | 9/2005 |
| WO | WO-2005/090520 A1 | 9/2005 |

OTHER PUBLICATIONS

Yokokoji.O et al., "Synthesis of new chiral compounds for cholesteric liquid crystal display,", Liquid Crystals, Aug. 1, 2008, vol. 35, No. 8, pp. 995-1003.

* cited by examiner

*Primary Examiner* — Shean C Wu
(74) *Attorney, Agent, or Firm* — Nixon Peabody LLP; Jeffrey L. Costellia

(57) ABSTRACT

A liquid crystal composition exhibiting a blue phase, which enables higher contrast, and a liquid crystal display device including the liquid crystal composition. The liquid crystal composition contains a chiral agent and liquid crystal containing a compound having three electron-withdrawing groups as end groups of a structure where a plurality of rings including at least one aromatic ring is linked to each other directly or with a linking group laid therebetween. At least one of the three electron-withdrawing groups includes a trifluoromethyl group. The peak of the diffracted wavelength on the longest wavelength side in the reflectance spectrum of the liquid crystal composition is less than or equal to 450 nm, preferably less than or equal to 420 nm. Furthermore, a liquid crystal display device can be provided with the use of the liquid crystal composition.

24 Claims, 13 Drawing Sheets

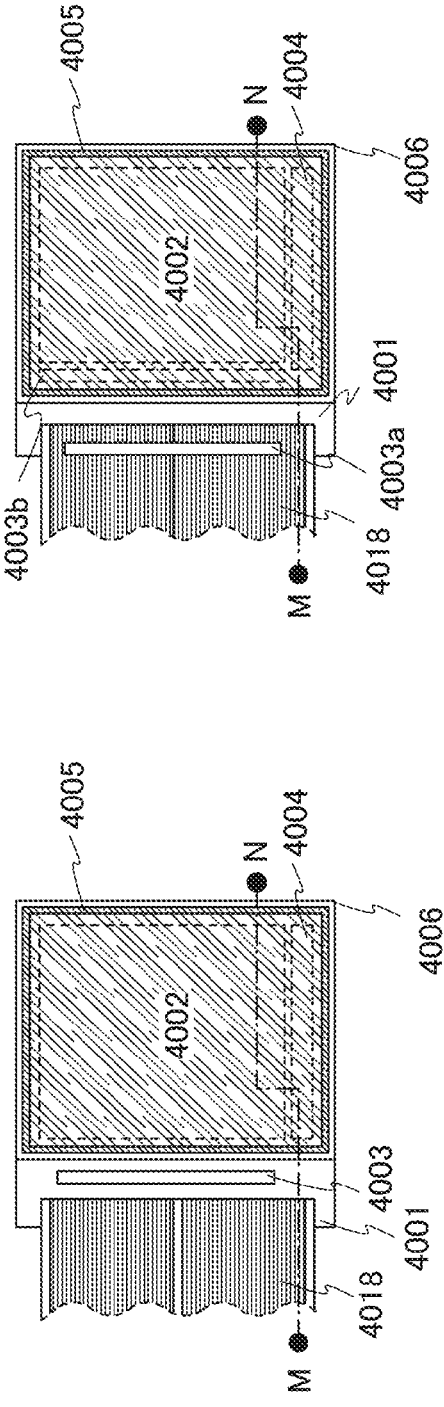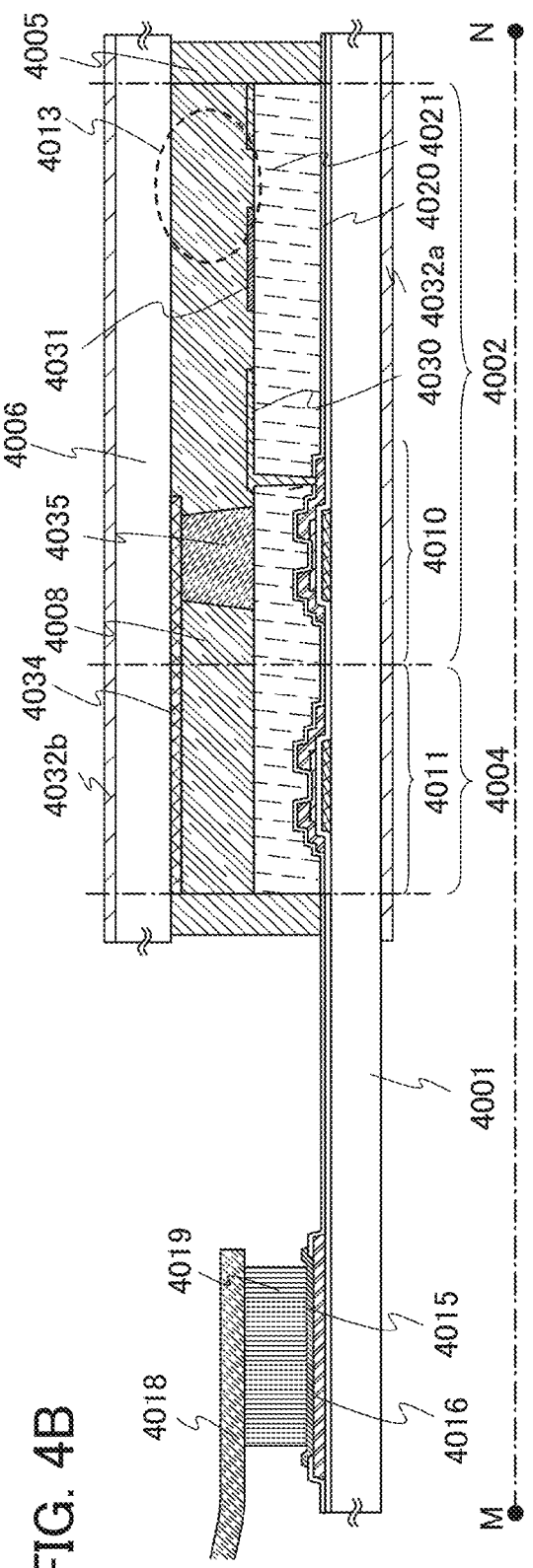

LIQUID CRYSTAL COMPOSITION AND LIQUID CRYSTAL DISPLAY DEVICE

BACKGROUND OF THE INVENTION

1. Field of the Invention

The present invention relates to a liquid crystal composition, a liquid crystal display device, and a manufacturing method thereof.

2. Description of the Related Art

As a display device which is thin and lightweight (a flat panel display), a liquid crystal display device including a liquid crystal element, a light-emitting device including a self light-emitting element, a field emission display (an FED), and the like have been competitively developed.

In a liquid crystal display device, response speed of liquid crystal molecules is required to be increased. Among various kinds of display modes of liquid crystal, liquid crystal modes capable of high-speed response are a ferroelectric liquid crystal (FLC) mode, an optically compensated bend (OCB) mode, and a mode using liquid crystal exhibiting a blue phase.

In particular, the mode using liquid crystal exhibiting a blue phase does not need an alignment film and provides a wide viewing angle, and thus has been developed more actively for practical use (see Patent Documents 1 and 2, for example).

REFERENCE

[Patent Document 1] PCT International Publication No. 2005-090520
[Patent Document 2] Japanese Published Patent Application No. 2008-303381

SUMMARY OF THE INVENTION

An object is to provide a liquid crystal composition exhibiting a blue phase, which enables higher contrast, and a liquid crystal display device including the liquid crystal composition.

One embodiment of the invention disclosed in this specification is a liquid crystal composition which contains a chiral agent and liquid crystal containing a compound having three electron-withdrawing groups as end groups of a structure where a plurality of rings including at least one aromatic ring is linked to each other directly or with a linking group laid therebetween. At least one of the three electron-withdrawing groups includes a trifluoromethyl group. The liquid crystal composition exhibits a blue phase, in which the peak of the diffracted wavelength on the longest wavelength side in the reflectance spectrum is less than or equal to 450 nm, preferably less than or equal to 420 nm.

In the compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, the plurality of rings may include cycloalkane. Furthermore, it is preferable that a benzene ring have the electron-withdrawing groups as substituents. As the other three electron-withdrawing group(s) which does (do) not include a trifluoromethyl group, a cyano group and/or fluorine can be used.

A blue phase appears in a liquid crystal composition having strong twisting power and has a double twist structure. The liquid crystal composition shows a cholesteric phase, a cholesteric blue phase, an isotropic phase, or the like depending on conditions.

A cholesteric blue phase which is a blue phase includes three structures of blue phase I, blue phase II, and blue phase III from the low temperature side. A cholesteric blue phase which is a blue phase is optically isotropic, and blue phase I and blue phase II have body-centered cubic symmetry and simple cubic symmetry, respectively. In the cases of blue phase I and blue phase II, Bragg diffraction is seen in the range from ultraviolet light to visible light.

As the indicators of the strength of twisting power, the helical pitch, the selective reflection wavelength, helical twisting power (HTP), and the diffracted wavelength are given. Among them, the helical pitch, the selective reflection wavelength, and HTP are used for evaluation of a cholesteric phase. On the other hand, the diffracted wavelength can be used for only evaluation of a blue phase, so that it is effective for evaluation of the twisting power of a blue phase. In the reflectance spectrum of a liquid crystal composition measured within the temperature range where a blue phase appears, as the diffracted wavelength is on the shorter wavelength side, the liquid crystal composition has a smaller crystal lattice of a blue phase and stronger twisting power.

In the liquid crystal composition, the peak of the diffracted wavelength on the longest wavelength side in the reflectance spectrum is less than or equal to 450 nm, preferably less than or equal to 420 nm, and the twisting power is strong. When the twisting power of the liquid crystal composition is strong, the transmittance of the liquid crystal composition at the time of no voltage application (at an applied voltage of 0 V) can be low, leading to a higher contrast of a liquid crystal display device including the liquid crystal composition.

The chiral agent is used to induce twisting of the liquid crystal composition, align the liquid crystal composition in a helical structure, and make the liquid crystal composition exhibit a blue phase. For the chiral agent, a compound which has an asymmetric center, high compatibility with the liquid crystal composition, and strong twisting power is used. In addition, the chiral agent is an optically active substance; a higher optical purity is better and the most preferable optical purity is 99% or higher.

Since the liquid crystal composition has strong twisting power, the chiral agent can be contained in the liquid crystal composition at 10 wt % or less. When a large amount of chiral agent is added to improve the twisting power of the liquid crystal composition, driving voltage applied to drive the liquid crystal composition might increase. By reduction in the additive amount of chiral agent as in the liquid crystal composition, driving voltage can be low, resulting in lower power consumption.

A liquid crystal composition exhibiting a blue phase has an optical modulation property. It is optically isotropic at the time of no voltage application, whereas it becomes optically anisotropic when the alignment order changes by voltage application. The liquid crystal composition exhibiting a blue phase can be used for a liquid crystal display device. One embodiment of the invention disclosed in this specification is a liquid crystal display device including the liquid crystal composition exhibiting a blue phase.

In the liquid crystal display device, the peak of the diffracted wavelength on the longest wavelength side in the reflectance spectrum of the liquid crystal composition is preferably less than or equal to 450 nm, more preferably less than or equal to 420 nm.

In this specification, the peak of the diffracted wavelength of 450 nm or less (preferably 420 nm or less) in the reflectance spectrum of a liquid crystal composition refers to the peak with the maximum value (the value at the top of the peak) on the longest wavelength side. Thus, in the case where the reflectance spectrum has a plurality of peaks, the peak with the maximum value on the longest wavelength side is the peak of the diffracted wavelength even if the peak has a shoulder (a level difference or a low peak).

A blue phase is optically isotropic and thus has no viewing angle dependence. Thus, an alignment film is not necessarily formed, which enables improvement in display image quality and cost reduction.

In a liquid crystal display device, it is preferable that a polymerizable monomer be added to a liquid crystal composition and polymer stabilization treatment be performed in order to broaden the temperature range within which a blue phase appears. As the polymerizable monomer, for example, a thermopolymerizable monomer which can be polymerized by heat, a photopolymerizable monomer which can be polymerized by light, or a polymerizable monomer which can be polymerized by heat and light can be used. Furthermore, a polymerization initiator may be added to the liquid crystal composition.

For example, polymer stabilization treatment can be performed in such a manner that a photopolymerizable monomer and a photopolymerization initiator are added to the liquid crystal composition and the liquid crystal composition is irradiated with light having a wavelength at which the photopolymerizable monomer and the photopolymerization initiator react with each other. When a UV-polymerizable monomer is used as a photopolymerizable monomer, the liquid crystal composition may be irradiated with ultraviolet light.

The liquid crystal composition exhibiting a blue phase is capable of high-speed response. Thus, a high-performance liquid crystal display device can be achieved.

A liquid crystal composition which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum, has strong twisting power. Therefore, the transmittance of the liquid crystal composition at the time of no voltage application (at an applied voltage of 0 V) can be low.

The use of the liquid crystal composition exhibiting a blue phase contributes to higher contrast, so that a liquid crystal display device having a high level of visibility and high image quality can be provided.

BRIEF DESCRIPTION OF THE DRAWINGS

In the accompanying drawings:

FIGS. 4A1, 4A2, and 4B illustrate liquid crystal display modules;

DETAILED DESCRIPTION OF THE INVENTION

Figure 1:
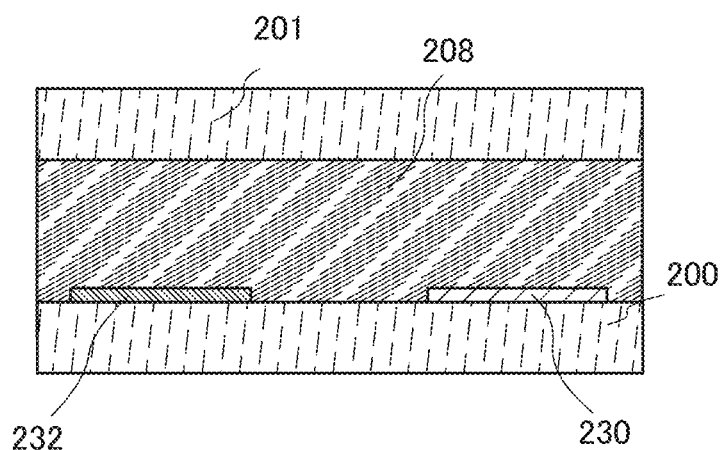
FIG. 1 is a conceptual view illustrating a liquid crystal composition.

Embodiments and examples will be described in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be construed as being limited to the descriptions of the embodiments and the examples below. In the structures to be given below, the same portions or portions having similar functions are denoted by the same reference numerals in different drawings, and descriptions thereof will not be repeated.

Note that the ordinal numbers such as "first", "second", and "third" in this specification are used for convenience and do not denote the order of steps and the stacking order of layers. In addition, the ordinal numbers in this specification do not denote particular names that specify the present invention.

In this specification, a semiconductor device means a general device that can function by utilizing semiconductor characteristics, and an electrooptic device, a semiconductor circuit, and an electronic device are all semiconductor devices.

Embodiment 1

A liquid crystal composition according to one embodiment of the invention disclosed in this specification, and a liquid crystal display device including the liquid crystal composition will be described with reference to FIG. 1. FIG. 1 is a cross-sectional view of a liquid crystal display device.

The liquid crystal composition according to this embodiment is a liquid crystal composition which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum.

In the compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, the plurality of rings may include cycloalkane. Furthermore, it is preferable that a benzene ring have the electron-withdrawing groups as substituents.

The electron-withdrawing group including a trifluoromethyl group can be a trifluoromethyl group, a trifluoromethyl group bonded to carbon, or a trifluoromethyl group bonded to oxygen.

Each of the three electron-withdrawing groups may include a trifluoromethyl group. Alternatively, one or two of the three electron-withdrawing groups may include a trifluoromethyl group and be combined with an electron-withdrawing group(s) that does (do) not include a trifluoromethyl group.

The electron-withdrawing group that does not include a trifluoromethyl group can be one of fluorine (F), bromine (Br), chlorine (Cl), iodine (I), a cyano group (CN), a trifluoromethylsulfonyl group ($SO_2CF_3$), a nitro group ($NO_2$), an isothiocyanate group (NCS), a thiocyanato group (SCN), and a pentafluorosulfanyl group ($SF_5$). In the case where one of the three electron-withdrawing groups includes a trifluoromethyl group, the other two electron-withdrawing groups that do not include a trifluoromethyl group may be the same, or may be a combination of two selected from the above.

In the liquid crystal composition, the plurality of rings including at least one aromatic ring may be linked to each other directly or with a linking group laid between the rings. The linking group is a bivalent group. Specific examples of the linking group include linking groups represented by the structural formulae (1) to (24). Note that there is not particular limitation on the direction of link in these linking groups can be any direction.

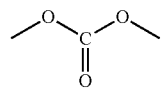
(1)

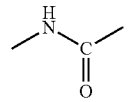
(2)

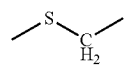
(3)

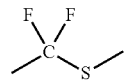
(4)

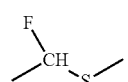
(5)

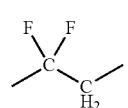
(6)

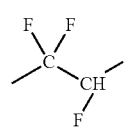
(7)

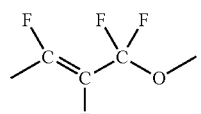
(8)

(9)

(10)

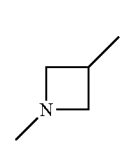
(11)

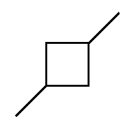
(12)

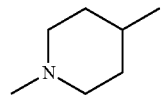

-continued

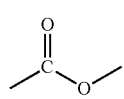
(13)

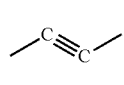
(14)

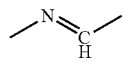
(15)

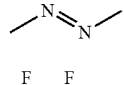
(16)

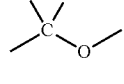
(17)

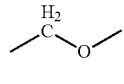
(18)

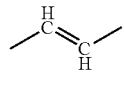
(19)

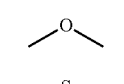
(20)

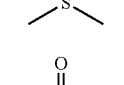
(21)

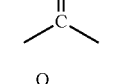
(22)

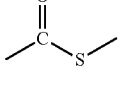
(23)

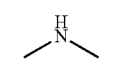
(24)

Specific examples of a compound including a trisubstituted benzene ring with electron-withdrawing groups include compounds represented by the structural formulae (150) to (170). Note that one embodiment of the present invention is not limited to these.

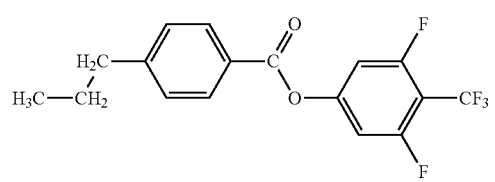(150)
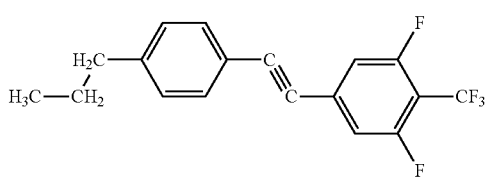(158)
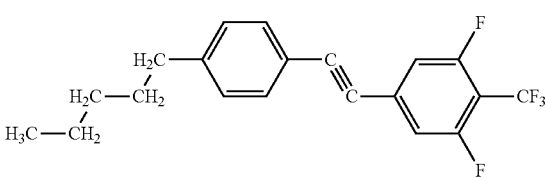(151)
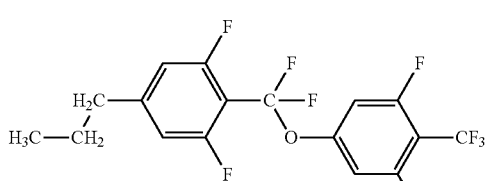(159)
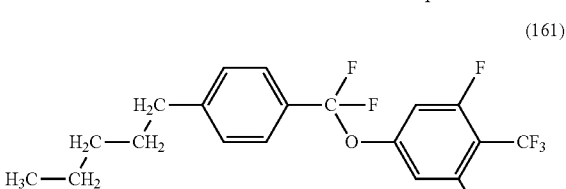(152)
(160)
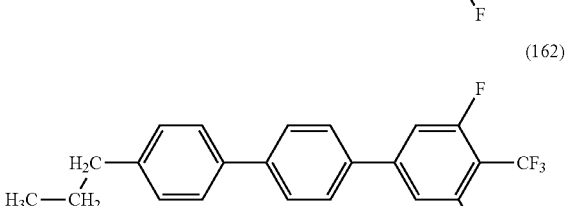(153)
(161)
(154)
(162)
(155)
(163)
(156)
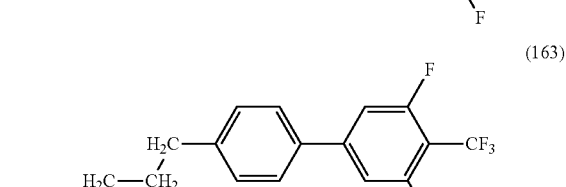(164)
(157)
(165)
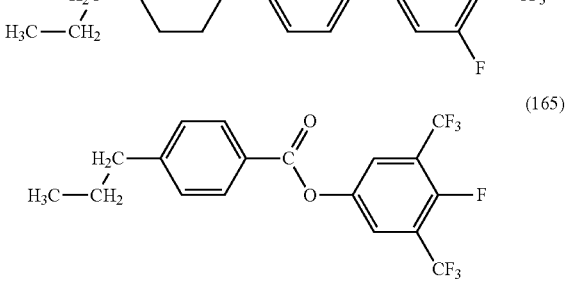

-continued

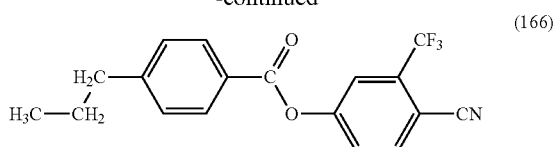
(166)

(167)

(168)

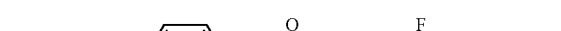
(169)

(170)

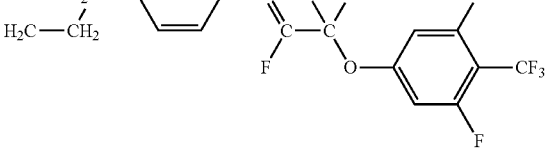

In the liquid crystal composition, the peak of the diffracted wavelength on the longest wavelength side in the reflectance spectrum is less than or equal to 450 nm, preferably less than or equal to 420 nm, and the twisting power is strong. When the twisting power of the liquid crystal composition is strong, the transmittance of the liquid crystal composition at the time of no voltage application (at an applied voltage of 0 V) can be low, leading to a higher contrast of a liquid crystal display device including the liquid crystal composition.

The chiral agent is used to induce twisting of the liquid crystal composition, align the liquid crystal composition in a helical structure, and make the liquid crystal composition exhibit a blue phase. For the chiral agent, a compound which has an asymmetric center, high compatibility with the liquid crystal composition, and strong twisting power is used. In addition, the chiral agent is an optically active substance; a higher optical purity is better and the most preferable optical purity is 99% or higher.

In the liquid crystal composition according to this embodiment, the peak of the diffracted wavelength on the longest wavelength side in the reflectance spectrum is a short wavelength of less than or equal to 450 nm, preferably less than or equal to 420 nm; thus, the twisting power is strong. Accordingly, the amount of chiral agent to be added can be reduced. For example, the chiral agent may be contained in the liquid crystal composition at 10 wt % or less. When a large amount of chiral agent is added to improve the twisting power of the liquid crystal composition, driving voltage applied to drive the liquid crystal composition might increase. Reduction in the amount of chiral agent to be added allows decrease in driving voltage, resulting in lower power consumption.

The liquid crystal composition exhibiting a blue phase, which is disclosed in this specification, can be used for a liquid crystal display device.

A blue phase is optically isotropic and thus has no viewing angle dependence. Thus, an alignment film is not necessarily formed, which enables improvement in display image quality and cost reduction.

In a liquid crystal display device, it is preferable that a polymerizable monomer be added to a liquid crystal composition and polymer stabilization treatment be performed in order to broaden the temperature range within which a blue phase appears. As the polymerizable monomer, for example, a thermopolymerizable (thermosetting) monomer which can be polymerized by heat, a photopolymerizable (photocurable) monomer which can be polymerized by light, or a polymerizable monomer which can be polymerized by heat and light can be used. Furthermore, a polymerization initiator may be added to the liquid crystal composition.

The polymerizable monomer may be a monofunctional monomer such as acrylate or methacrylate; a polyfunctional monomer such as diacrylate, triacrylate, dimethacrylate, or trimethacrylate; or a mixture thereof. Furthermore, the polymerizable monomer may be a polymerizable monomer having liquid crystallinity, a polymerizable monomer having non-liquid crystallinity, or a mixture of them.

As the polymerization initiator, a radical polymerization initiator which generates radicals by light irradiation, an acid generator which generates an acid by light irradiation, or a base generator which generates a base by light irradiation may be used.

For example, polymer stabilization treatment can be performed in such a manner that a photopolymerizable monomer and a photopolymerization initiator are added to the liquid crystal composition and the liquid crystal composition is irradiated with light having a wavelength at which the photopolymerizable monomer and the photopolymerization initiator react with each other. A typical example of the photopolymerizable monomer is a UV polymerizable monomer. When a UV polymerizable monomer is used as a photopolymerizable monomer, the liquid crystal composition may be irradiated with ultraviolet light.

This polymer stabilization treatment may be performed on a liquid crystal composition exhibiting an isotropic phase or a liquid crystal composition exhibiting a blue phase under the control of the temperature. A temperature at which the phase changes from a blue phase to an isotropic phase when the temperature rises, or a temperature at which the phase changes from an isotropic phase to a blue phase when the temperature falls is referred to as phase transition temperature between a blue phase and an isotropic phase. For example, the polymer stabilization treatment can be performed in the following manner: after a liquid crystal composition to which a photopolymerizable monomer is added is heated to exhibit an isotropic phase, the temperature of the liquid crystal composition is gradually lowered so that the phase changes to a blue phase, and then, light irradiation is performed while the temperature at which a blue phase appears is kept.

FIG. 1 illustrates an example in which the liquid crystal composition exhibiting a blue phase, which is disclosed in this specification, is used for a liquid crystal display device.

FIG. 1 illustrates a liquid crystal display device in which a first substrate 200 and a second substrate 201 are positioned so as to face each other with a liquid crystal composition 208 exhibiting a blue phase interposed between the first substrate 200 and the second substrate 201. A pixel electrode layer 230 and a common electrode layer 232 are provided between the first substrate 200 and the liquid crystal composition 208 so as to be adjacent to each other.

In a liquid crystal display device including a liquid crystal composition exhibiting a blue phase, a method can be used in which the gray scale is controlled by moving liquid crystal molecules in a plane parallel to the substrate with the application of an electric field parallel to or substantially parallel to a substrate (i.e., in the lateral direction).

The pixel electrode layer 230 and the common electrode layer 232, which are adjacent to each other with the liquid crystal composition 208 interposed therebetween, have a distance at which liquid crystal in the liquid crystal composition 208 between the pixel electrode layer 230 and the common electrode layer 232 responds to a predetermined voltage which is applied to the pixel electrode layer 230 and the common electrode layer 232. The voltage applied is controlled as appropriate depending on the distance.

The maximum thickness (film thickness) of the liquid crystal composition 208 is preferably greater than or equal to 1 μm and less than or equal to 20 μm.

The liquid crystal composition 208 can be formed by a dispenser method (a dropping method), or an injection method by which liquid crystal is injected using capillary action or the like after the first substrate 200 and the second substrate 201 are attached to each other.

As the liquid crystal composition 208, a liquid crystal composition which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum, is used. Furthermore, the liquid crystal composition provided as the liquid crystal composition 208 may contain an organic resin.

With an electric field generated between the pixel electrode layer 230 and the common electrode layer 232, liquid crystal is controlled. An electric field in the lateral direction is generated in the liquid crystal, so that liquid crystal molecules can be controlled using the electric field.

In the liquid crystal composition according to this embodiment, the peak of the diffracted wavelength on the longest wavelength side in the reflectance spectrum is less than or equal to 450 nm, preferably less than or equal to 420 nm, and the twisting power is strong. When the twisting power of the liquid crystal composition is strong, the transmittance of the liquid crystal composition at the time of no voltage application (at an applied voltage of 0 V) can be low, leading to a higher contrast of a liquid crystal display device including the liquid crystal composition. An increase in contrast makes it possible to provide a liquid crystal display device having a high level of visibility and high image quality.

The liquid crystal composition exhibiting a blue phase is capable of high-speed response. Thus, a high-performance liquid crystal display device can be achieved.

For example, such a liquid crystal composition exhibiting a blue phase, which is capable of high-speed response, can be favorably used for a successive additive color mixing method (a field sequential method) in which light-emitting diodes (LEDs) of RGB or the like are arranged in a backlight unit and color display is performed by time division, or a three-dimensional display method using a shutter glasses system in which images for a right eye and images for a left eye are alternately viewed by time division.

Although not illustrated in FIG. 1, an optical film such as a polarizing plate, a retardation plate, or an anti-reflection film, or the like is provided as appropriate. For example, circular polarization with the polarizing plate and the retardation plate may be used. In addition, a backlight or the like can be used as a light source.

In this specification, a substrate provided with a semiconductor element (e.g., a transistor), a pixel electrode layer, and a common electrode layer is referred to as an element substrate (a first substrate), and a substrate which faces the element substrate with a liquid crystal composition interposed therebetween is referred to as a counter substrate (a second substrate).

The liquid crystal composition exhibiting a blue phase, which is disclosed in this specification, is used for a liquid crystal display device. Thus, a transmissive liquid crystal display device in which display is performed by transmission of light from a light source, a reflective liquid crystal display device in which display is performed by reflection of incident light, or a transflective liquid crystal display device in which a transmissive type and a reflective type are combined can be provided.

In the case of the transmissive liquid crystal display device, a first substrate, a second substrate, and other components such as an insulating film and a conductive film, which are provided in a pixel region through which light is transmitted, transmit light in the visible wavelength range. It is preferable that the pixel electrode layer and the common electrode layer transmit light; however, if an opening pattern is provided, a non-light-transmitting material such as a metal film may be used depending on the shape.

On the other hand, in the case of the reflective liquid crystal display device, a reflective component which reflects light transmitted through the liquid crystal composition (e.g., a reflective film or substrate) may be provided on the side opposite to the viewing side of the liquid crystal composition. Therefore, a substrate, an insulating film, and a conductive film, which are provided between the viewing side and the reflective component and through which light is transmitted, have a light-transmitting property with respect to light in the visible wavelength range. Note that in this specification, a light-transmitting property refers to a property of transmitting at least light in the visible wavelength range.

The pixel electrode layer 230 and the common electrode layer 232 may be formed using one or more of the following: indium tin oxide, a conductive material in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, and indium tin oxide containing titanium oxide; graphene; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

As the first substrate 200 and the second substrate 201, a glass substrate of barium borosilicate glass, aluminoborosilicate glass, or the like, a quartz substrate, a plastic substrate, or the like can be used.

In the liquid crystal composition according to this embodiment, the peak of the diffracted wavelength on the longest wavelength side in the reflectance spectrum is less than or equal to 450 nm, preferably less than or equal to 420 nm, and the twisting power is strong. Thus, the transmittance of the liquid crystal composition at the time of no voltage application (at an applied voltage of 0 V) can be low.

Thus, with the use of the liquid crystal composition exhibiting a blue phase, a liquid crystal display device with higher contrast can be provided.

This embodiment can be implemented in appropriate combination with any of the structures described in the other embodiments.

Embodiment 2

As a liquid crystal display device according to one embodiment of the present invention, a passive matrix liquid crystal display device and an active matrix liquid crystal display device can be provided. In this embodiment, an example of an active matrix liquid crystal display device according to one embodiment of the present invention will be described with reference to FIGS. 2A and 2B and FIGS. 3A to 3D.

Figure 2A:
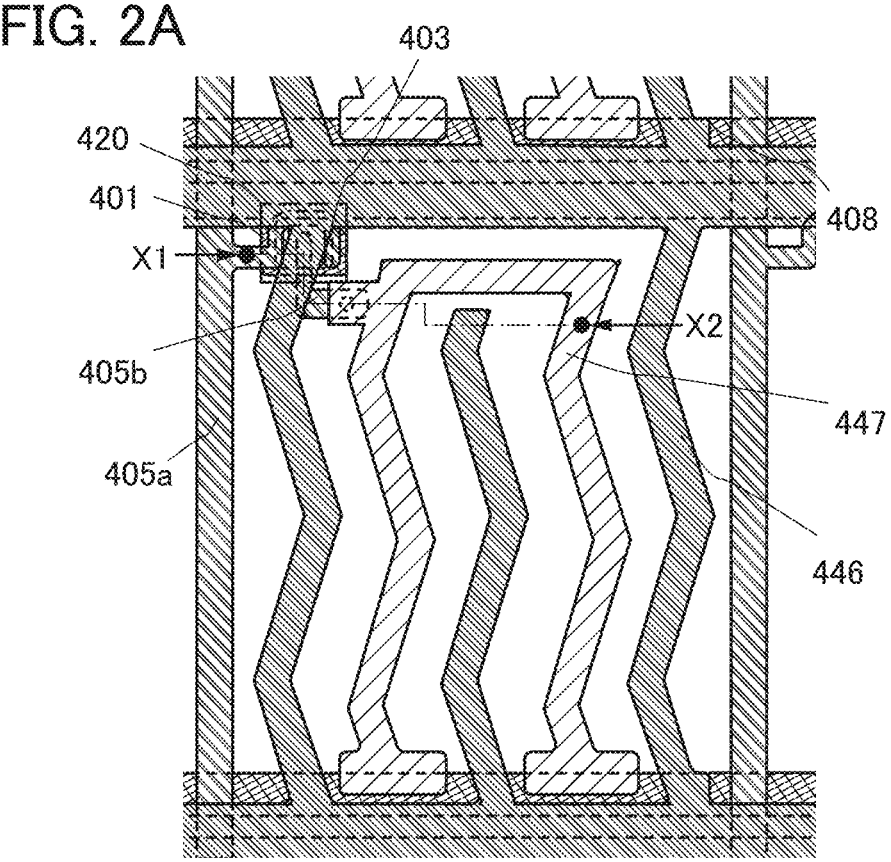
FIGS. 2A and 2B illustrate one mode of a liquid crystal display device.
Figure 2B:
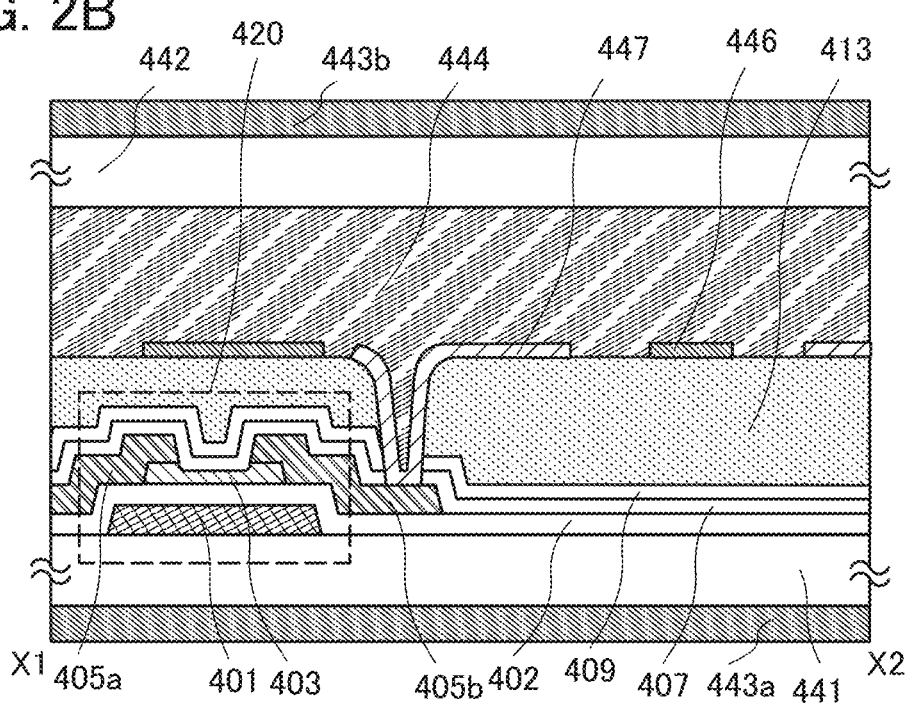

FIG. 2A is a plan view of the liquid crystal display device and illustrates one pixel. FIG. 2B is a cross-sectional view along the line X1-X2 in FIG. 2A.

In FIG. 2A, a plurality of source wiring layers (including a wiring layer 405a) is arranged so as to be parallel to (extended in the longitudinal direction in the drawing) and be apart from each other. A plurality of gate wiring layers (including a gate electrode layer 401) is arranged so as to be extended in the direction perpendicular to or substantially perpendicular to the source wiring layers (in the horizontal direction in the drawing) and apart from each other. Common wiring layers 408 are provided so as to be adjacent to the corresponding gate wiring layers and extended in the direction parallel to or substantially parallel to the gate wiring layers, that is, in the direction perpendicular to or substantially perpendicular to the source wiring layers (in the horizontal direction in the drawing). A roughly rectangular space is surrounded by the source wiring layers, the common wiring layer 408, and the gate wiring layer. In this space, a pixel electrode layer and a common electrode layer of the liquid crystal display device are provided. A transistor 420 for driving the pixel electrode layer is provided at an upper left corner of the drawing. A plurality of pixel electrode layers and a plurality of transistors are arranged in a matrix.

In the liquid crystal display device in FIGS. 2A and 2B, a first electrode layer 447 electrically connected to the transistor 420 serves as a pixel electrode layer, while a second electrode layer 446 electrically connected to the common wiring layer 408 serves as a common electrode layer. Note that a capacitor is formed with the first electrode layer and the common wiring layer. Although the common electrode layer can operate in a floating state (an electrically isolated state), the potential of the common electrode layer may be set to a fixed potential, preferably to a potential around an intermediate potential of an image signal which is transmitted as data at such a level as not to generate flickers.

A method can be used in which the gray scale is controlled by generating an electric field parallel to or substantially parallel to a substrate (i.e., in the lateral direction) to move liquid crystal molecules in a plane parallel to the substrate. For such a method, an electrode structure used in an IPS mode illustrated in any of FIGS. 2A and 2B and FIGS. 3A to 3D can be employed.

In a lateral electric field mode such as an IPS mode, a first electrode layer (e.g., a pixel electrode layer with which a voltage is controlled in each pixel) and a second electrode layer (e.g., a common electrode layer with which a common voltage is applied to all pixels), each of which has an opening pattern, are located below a liquid crystal composition. Therefore, the first electrode layer 447 and the second electrode layer 446, one of which serves as a pixel electrode layer and the other of which serves as a common electrode layer, are formed over a first substrate 441, and at least one of the first electrode layer and the second electrode layer is formed over an insulating film. The first electrode layer 447 and the second electrode layer 446 are not flat but have various opening patterns including a bent portion or a branched comb-like portion. An arrangement of the first electrode layer 447 and the second electrode layer 446, which complies with both conditions that they have the same shape and they completely overlap with each other, is avoided in order to generate an electric field between the electrodes.

The first electrode layer 447 and the second electrode layer 446 may have an electrode structure used in an FFS mode. In a lateral electric field mode such as an FFS mode, a first electrode layer (e.g., a pixel electrode layer with which a voltage is controlled in each pixel) having an opening pattern is located below a liquid crystal composition, and further, a second electrode layer (e.g., a common electrode layer with which a common voltage is applied to all pixels) having a flat shape is located below the opening pattern. In this case, the first electrode layer and the second electrode layer, one of which serves as a pixel electrode layer and the other of which serves as a common electrode layer, are formed over the first substrate 441, and the pixel electrode layer and the common electrode layer are stacked with an insulating film (or an interlayer insulating film) interposed therebetween. One of the pixel electrode layer and the common electrode layer is formed below the insulating film (or the interlayer insulating film), whereas the other is formed above the insulating film (or the interlayer insulating film) and has various opening patterns including a bent portion or a branched comb-like portion. An arrangement of the first electrode layer 447 and the second electrode layer 446, which complies with both conditions that they have the same shape and they completely overlap with each other, is avoided in order to generate an electric field between the electrodes.

As the liquid crystal composition 444, the liquid crystal composition according to Embodiment 1, which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum, is used. The liquid crystal composition 444 may further contain an organic resin. In this embodiment, the liquid crystal composition 444 is subjected to polymer stabilization treatment, and the liquid crystal composition 444 is provided in a liquid crystal display device with a blue phase exhibited (in a state where a blue phase appears).

With an electric field generated between the first electrode layer 447 as the pixel electrode layer and the second electrode layer 446 as the common electrode layer, liquid crystal of the liquid crystal composition 444 is controlled. An electric field in the lateral direction is generated in the liquid crystal, so that liquid crystal molecules can be controlled using the electric field.

Figure 3A:
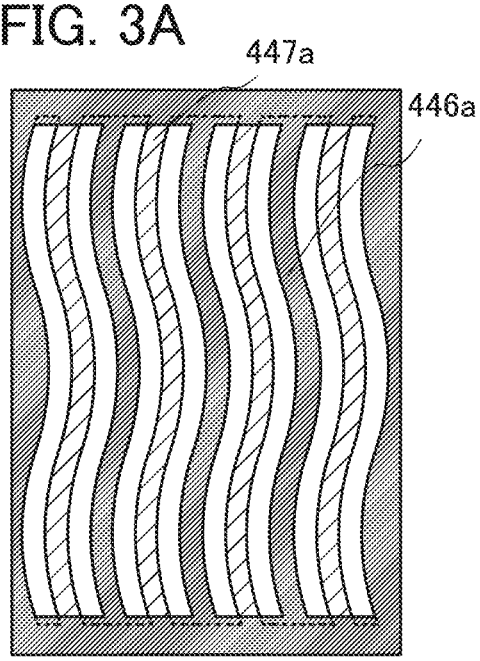
FIGS. 3A to 3D each illustrate one mode of an electrode structure of a liquid crystal display device.
Figure 3B:
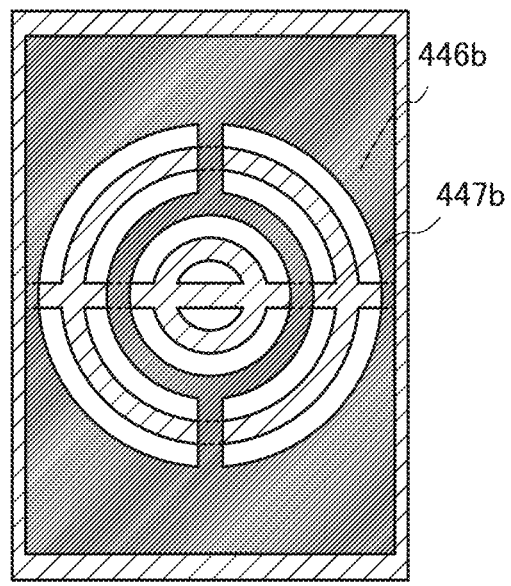
Figure 3C:
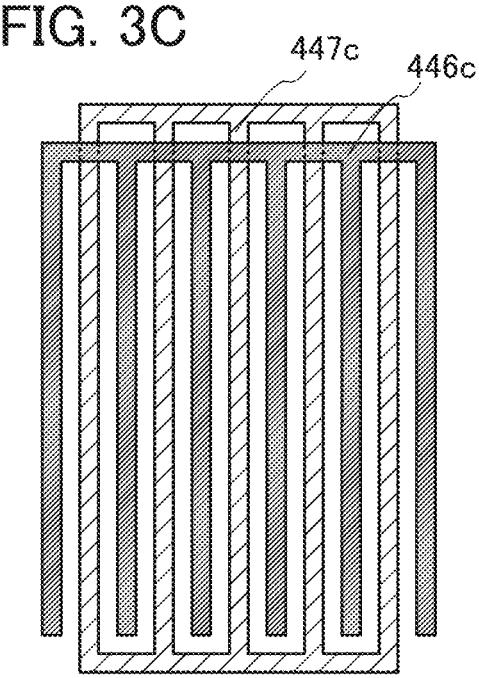
Figure 3D:
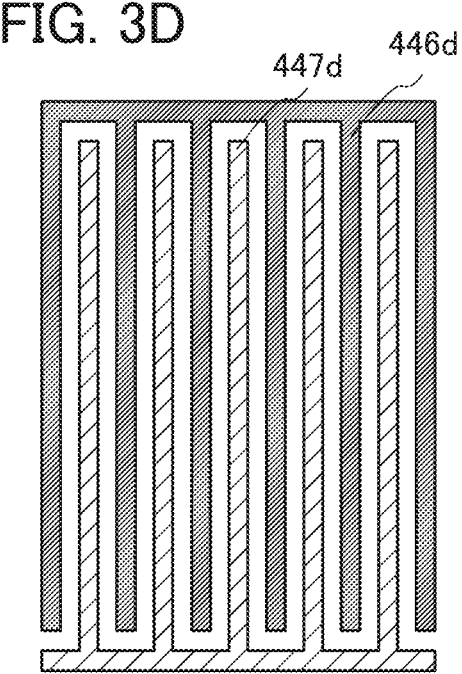

FIGS. 3A to 3D illustrate other examples of the first electrode layer 447 and the second electrode layer 446. As illustrated in top views of FIGS. 3A to 3D, first electrode layers 447a to 447d and second electrode layers 446a to 446d are arranged alternately. In FIG. 3A, the first electrode layer 447a and the second electrode layer 446a have an undulating wave shape. In FIG. 3B, the first electrode layer 447b and the second electrode layer 446b have shapes with concentric openings. In FIG. 3C, the first electrode layer 447c and the second electrode layer 446c have comb-like shapes and partially overlap with each other. In FIG. 3D, the first electrode layer 447d and the second electrode layer 446d have comb-like shapes in which the electrode layers engage with each other. In the case where the first electrode layers 447a, 447b, and 447c overlap with the second electrode layers 446a, 446b, and 446c, respectively, as illustrated in FIGS. FIGS. 3A to 3C, an insulating film is formed between the first electrode layer 447 and the second electrode layer 446 so that the first electrode layer 447 and the second electrode layer 446 are formed over different films.

Since the first electrode layer 447 and the second electrode layer 446 have opening patterns, they are illustrated as divided plural electrode layers in the cross-sectional view in FIG. 2B. The same applies to the other drawings of this specification.

The transistor 420 is an inverted staggered thin film transistor in which the gate electrode layer 401, a gate insulating layer 402, a semiconductor layer 403, and wiring layers 405a and 405b which function as a source electrode layer and a drain electrode layer are formed over the first substrate 441 having an insulating surface.

There is no particular limitation on the structure of a transistor which can be used for a liquid crystal display device disclosed in this specification. For example, a staggered type or a planar type having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel region with a gate insulating layer interposed therebetween.

An insulating film 407 which is in contact with the semiconductor layer 403, and an insulating film 409 are provided to cover the transistor 420. An interlayer film 413 is stacked over the insulating film 409.

There is no particular limitation on the method for forming the interlayer film 413, and the following method can be employed depending on the material: spin coating, dip coating, spray coating, a droplet discharging method (an ink-jet method), screen printing, offset printing, roll coating, curtain coating, knife coating, or the like.

The first substrate 441 and the second substrate 442 which is a counter substrate are firmly attached to each other with a sealant with the liquid crystal composition 444 interposed therebetween. The liquid crystal composition 444 can be formed by a dispenser method (a dropping method), or an injection method by which liquid crystal is injected using capillary action or the like after the first substrate 441 is attached to the second substrate 442.

As the sealant, typically, a visible light curable resin, a UV curable resin, or a thermosetting resin is preferably used. Typically, an acrylic resin, an epoxy resin, an amine resin, or the like can be used. Furthermore, a photopolymerization initiator (typically, a UV polymerization initiator), a thermosetting agent, a filler, or a coupling agent may be contained in the sealant.

In this embodiment, the liquid crystal composition 444 is subjected to polymer stabilization treatment; thus, as the liquid crystal composition 444, a liquid crystal composition is used, which is obtained by adding a photopolymerizable monomer and a photopolymerization initiator to the liquid crystal composition according to Embodiment 1, which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum.

After the space between the first substrate 441 and the second substrate 442 is filled with the liquid crystal composition, polymer stabilization treatment is performed by light irradiation, whereby the liquid crystal composition 444 is formed. The light has a wavelength with which the polymerizable monomer and the photopolymerization initiator which are contained in the liquid crystal composition used as the liquid crystal composition 444 react with each other. By such polymer stabilization treatment by light irradiation, the temperature range within which the liquid crystal composition 444 exhibits a blue phase can be broadened.

In the case where a photocurable resin such as a UV curable resin is used as a sealant and a liquid crystal composition is formed by a dropping method, for example, the sealant may be cured in the light irradiation step of the polymer stabilization treatment.

In this embodiment, a polarizing plate 443a is provided on the outer side (on the side opposite to the liquid crystal composition 444) of the first substrate 441, and a polarizing plate 443b is provided on the outer side (on the side opposite to the liquid crystal composition 444) of the second substrate 442. In addition to the polarizing plate, an optical film such as a retardation plate or an anti-reflection film may be provided. For example, circular polarization with the polarizing plate and the retardation plate may be used. Through the above process, a liquid crystal display device can be completed.

In the case of manufacturing a plurality of liquid crystal display devices using a large-sized substrate (a multiple panel method), a division step can be performed before the polymer stabilization treatment is performed or before the polarizing plates are provided. In consideration of the influence of the division step on the liquid crystal composition (such as alignment disorder due to force applied in the division step), it is preferable that the division step be performed after the attachment between the first substrate and the second substrate and before the polymer stabilization treatment.

Although not illustrated, a backlight, a sidelight, or the like may be used as a light source. Light from the light source is emitted from the side of the first substrate 441, which is an element substrate, so as to pass through the second substrate 442 on the viewing side.

The first electrode layer 447 and the second electrode layer 446 can be formed with the use of a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

The first electrode layer 447 and the second electrode layer 446 can be formed of one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The first electrode layer 447 and the second electrode layer 446 can be formed with the use of a conductive composition including a conductive macromolecule (also referred to as conductive polymer). The pixel electrode formed with the use of the conductive composition preferably has a sheet resistance of less than or equal to 10000 ohms per square and a transmittance of greater than or equal to 70% at a wavelength of 550 nm. Furthermore, the resistivity of the conductive macromolecule included in the conductive composition is preferably less than or equal to 0.1 $\Omega \cdot cm$.

As the conductive macromolecule, a so-called π-electron conjugated conductive macromolecule can be used. For example, polyaniline or a derivative thereof, polypyrrole or a derivative thereof, polythiophene or a derivative thereof, a copolymer of two or more kinds of them, and the like can be given.

An insulating film serving as a base film may be provided between the first substrate 441 and the gate electrode layer 401. The base film has a function of preventing diffusion of an impurity element from the first substrate 441, and can be formed to have a single-layer or layered structure using one or more of a silicon nitride film, a silicon oxide film, a silicon nitride oxide film, and a silicon oxynitride film. The gate electrode layer 401 can be a single-layer or layered structure using any of metal materials such as molybdenum, titanium, chromium, tantalum, tungsten, aluminum, copper, neodymium, and scandium, and an alloy material which contains any of these materials as its main component. A semiconductor film typified by a polycrystalline silicon film doped with an impurity element such as phosphorus, or a silicide film such as a nickel silicide film can also be used as the gate electrode layer 401. By using a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, and a two-layer structure in which a titanium nitride layer and a molybdenum layer are stacked. As a three-layer structure, a layered structure in which a tungsten layer or a tungsten nitride layer, an alloy layer of aluminum and silicon or an alloy layer of aluminum and titanium, and a titanium nitride layer or a titanium layer are stacked is preferable.

The gate insulating layer 402 can be formed using any of a silicon oxide film, a gallium oxide film, an aluminum oxide film, a silicon nitride film, a silicon oxynitride film, an aluminum oxynitride film, and a silicon nitride oxide film by a plasma CVD method, a sputtering method, or the like. Alternatively, a high-k material such as hafnium oxide, yttrium oxide, lanthanum oxide, hafnium silicate (HfSi$_x$O$_y$ (x>0, y>0)), hafnium aluminate (HfAl$_x$O$_y$ (x>0, y>0)), hafnium silicate to which nitrogen is added, or hafnium aluminate to which nitrogen is added may be used as a material for the gate insulating layer 402. The use of such a high-k material enables a reduction in gate leakage current.

Alternatively, the gate insulating layer 402 can be a silicon oxide layer formed by a CVD method using an organosilane gas. As an organosilane gas, a silicon-containing compound such as tetraethoxysilane (TEOS) (chemical formula: Si(OC$_2$H$_5$)$_4$), tetramethylsilane (TMS) (chemical formula: Si(CH$_3$)$_4$), tetramethylcyclotetrasiloxane (TMCTS), octamethylcyclotetrasiloxane (OMCTS), hexamethyldisilazane (HMDS), triethoxysilane (SiH(OC$_2$H$_5$)$_3$), or trisdimethylaminosilane (SiH(N(CH$_3$)$_2$)$_3$) can be used. Note that the gate insulating layer 402 may have a single-layer structure or a layered structure.

A material of the semiconductor layer 403 is not particularly limited and may be determined as appropriate in accordance with characteristics needed for the transistor 420. Examples of a material which can be used for the semiconductor layer 403 will be described.

The semiconductor layer 403 can be formed using the following material: an amorphous semiconductor manufactured by a sputtering method or a vapor-phase growth method using a semiconductor source gas typified by silane or germane; a polycrystalline semiconductor formed by crystallizing the amorphous semiconductor with the use of light energy or thermal energy; a microcrystalline semiconductor in which a minute crystalline phase and an amorphous phase coexist; or the like. The semiconductor layer can be formed by a sputtering method, an LPCVD method, a plasma CVD method, or the like.

A typical example of an amorphous semiconductor is hydrogenated amorphous silicon, while a typical example of a crystalline semiconductor is polysilicon. Examples of polysilicon (polycrystalline silicon) are as follows: high-temperature polysilicon which contains polysilicon formed at a process temperature of 800° C. or higher as its main component, low-temperature polysilicon which contains polysilicon formed at a process temperature of 600° C. or lower as its main component, and polysilicon obtained by crystallizing amorphous silicon with the use of an element that promotes crystallization, or the like. It is needless to say that a microcrystalline semiconductor or a semiconductor partly containing a crystal phase can be used as described above.

An oxide semiconductor film may be used as the semiconductor layer 403. The oxide semiconductor film preferably contains at least indium (In), and more preferably contains indium (In) and zinc (Zn). As a stabilizer for reducing the variations in electric characteristics of a transistor including the oxide semiconductor film, gallium (Ga) is preferably contained in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor, for example, any of the following can be used: indium oxide; tin oxide; zinc oxide; a two-component metal oxide such as an In—Zn-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that here, for example, an "In—Ga—Zn-based oxide" means an oxide containing In, Ga, and Zn as its main components and there is no particular limitation on the ratio of In:Ga:Zn. The In—Ga—Zn-based oxide may contain a metal element other than In, Ga, and Zn.

Alternatively, a material expressed by a chemical formula, $InMO_3(ZnO)_m$ (m>0, and m is not an integer) may be used as an oxide semiconductor. Note that M represents one or more metal elements selected from Ga, Fe, Mn, and Co.

Alternatively, as the oxide semiconductor, a material expressed by a chemical formula, $In_2SnO_5(ZnO)_n$ (n>0, and n is an integer) may be used.

For example, an In—Ga—Zn-based oxide with an atomic ratio of In:Ga:Zn=1:1:1 (=1/3:1/3:1/3), In:Ga:Zn=2:2:1 (=2/5:2/5:1/5), or In:Ga:Zn=3:1:2 (=1/2:1/6:1/3), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios can be used.

However, the oxide semiconductor is not limited to the materials given above, and a material with an appropriate composition may be used as the oxide semiconductor depending on needed semiconductor characteristics (e.g., mobility, threshold voltage, and variations). In order to obtain the needed semiconductor characteristics, it is preferable that the carrier concentration, the impurity concentration, the defect density, the atomic ratio between a metal element and oxygen, the interatomic distance, the density, and the like be set to appropriate values.

For example, high mobility can be obtained relatively easily in the case of using an In—Sn—Zn-based oxide. However, also in the case of using an In—Ga—Zn-based oxide, the mobility can be increased by reducing the defect density in a bulk.

Note that, for example, the expression "the composition of an oxide containing In, Ga, and Zn at the atomic ratio, In:Ga:Zn=a:b:c (a+b+c=1), is in the neighborhood of the composition of an oxide containing In, Ga, and Zn at the atomic ratio, In:Ga:Zn=A:B:C (A+B+C=1)" means that a, b, and c satisfy the following relation: $(a-A)^2+(b-B)^2+(c-C)^2 \leq r^2$. For example, r may be 0.05. The same applies to other oxides.

The oxide semiconductor film is in a single crystal state, a polycrystalline (also referred to as polycrystal) state, an amorphous state, or the like.

The oxide semiconductor film is preferably a CAAC-OS (c-axis aligned crystalline oxide semiconductor) film.

The CAAC-OS film is not completely single crystal nor completely amorphous. The CAAC-OS film is an oxide semiconductor film with a crystal-amorphous mixed phase structure where crystal parts are included in an amorphous phase. Note that in most cases, the crystal part fits inside a cube one side of which is less than 100 nm. From an observation image obtained with a transmission electron microscope (TEM), a boundary between an amorphous part and a crystal part in the CAAC-OS film is not clear. Furthermore, with the TEM, a grain boundary in the CAAC-OS film is not found. Thus, in the CAAC-OS film, a reduction in electron mobility due to the grain boundary is suppressed.

In each of the crystal parts included in the CAAC-OS film, a c-axis is aligned in the direction parallel to a normal vector of a surface where the CAAC-OS film is formed or a normal vector of a surface of the CAAC-OS film, triangular or hexagonal atomic arrangement which is seen from the direction perpendicular to the a-b plane is formed, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a simple term "perpendicular" includes a range from 85° to 95°. In addition, a simple term "parallel" includes a range from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Furthermore, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that when the CAAC-OS film is formed, the direction of c-axis of the crystal part is the direction parallel to a normal vector of the surface where the CAAC-OS film is formed or a normal vector of the surface of the CAAC-OS film. The crystal part is formed by film formation or by performing treatment for crystallization such as heat treatment after the film formation.

With the use of the CAAC-OS film in a transistor, change in electric characteristics of the transistor due to irradiation with visible light or ultraviolet light can be reduced. Thus, the transistor has high reliability.

Note that nitrogen may be substituted for part of oxygen included in the oxide semiconductor film may be substituted with nitrogen.

In an oxide semiconductor having a crystal part such as the CAAC-OS, defects in the bulk can be further reduced and when the surface flatness of the oxide semiconductor is improved, mobility higher than that of an oxide semiconductor in an amorphous state can be obtained. In order to improve the surface flatness, the oxide semiconductor is preferably formed over a flat surface. Specifically, the oxide semiconductor may be formed over a surface with the average surface roughness (Ra) of less than or equal to 1 nm, preferably less than or equal to 0.3 nm, more preferably less than or equal to 0.1 nm.

In a process of forming the semiconductor layer and the wiring layer, an etching step is employed to process thin films into desired shapes. Dry etching or wet etching can be employed for the etching step.

The etching conditions (such as an etchant, etching time, and temperature) are appropriately adjusted depending on the material so that the material can be etched to have a desired shape.

As a material of the wiring layers 405a and 405b serving as source and drain electrode layers, an element selected from Al, Cr, Ta, Ti, Mo, and W; an alloy containing any of the above elements as its component; an alloy film containing a combination of any of these elements; and the like can be given. Furthermore, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is combined with aluminum, it is possible to use an element selected from titanium (Ti), tantalum (Ta), tungsten (W), molybdenum (Mo), chromium (Cr), neodymium (Nd), and scandium (Sc); an alloy containing any of these elements as its component; an alloy containing a combination of any of these elements; or a nitride containing any of these elements as its component.

The gate insulating layer 402, the semiconductor layer 403, and the wiring layers 405a and 405b serving as source and drain electrode layers may be successively formed without being exposed to the air. Successive film formation without exposure to the air makes it possible to obtain each interface between stacked layers, which is not contaminated by atmospheric components or impurity elements floating in the air. Therefore, variation in characteristics of the transistor can be reduced.

Note that the semiconductor layer 403 is only partly etched so as to have a groove (a depressed portion).

As the insulating film 407 and the insulating film 409 which cover the transistor 420, an inorganic insulating film or an organic insulating film formed by a dry method or a wet method can be used. For example, it is possible to use a silicon nitride film, a silicon oxide film, a silicon oxynitride film, an aluminum oxide film, or a tantalum oxide film, which is formed by a CVD method, a sputtering method, or the like. Alternatively, an organic material such as polyimide, acrylic, a benzocyclobutene-based resin, polyamide, or epoxy can be used. Other than such organic materials, it is possible to use a low-dielectric constant material (a low-k material), a siloxane-based resin, PSG (phosphosilicate glass), BPSG (borophosphosilicate glass), or the like. A gallium oxide film may be used as the insulating film 407.

Note that a siloxane-based resin is a resin formed using a siloxane material as a starting material and having a Si—O—Si bond. The siloxane-based resin may include as a substituent an organic group (e.g., an alkyl group or an aryl group) or a fluoro group. The organic group may include a fluoro group. A siloxane-based resin is applied by a coating method and baked; thus, the insulating film 407 can be formed.

Alternatively, the insulating film 407 and the insulating film 409 may be formed by stacking a plurality of insulating films formed using any of these materials. For example, a structure may be employed in which an organic resin film is stacked over an inorganic insulating film.

Furthermore, with the use of a resist mask having regions with plural thicknesses (typically, two different thicknesses) which is formed using a multi-tone mask, the number of resist masks can be reduced, resulting in simplified process and lower cost.

As described above, higher contrast can be achieved with the use of a liquid crystal composition which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum. Accordingly, it is possible to provide a liquid crystal display device having a high level of visibility and high image quality.

The liquid crystal composition which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum, is capable of high-speed response. Thus, a high-performance liquid crystal display device can be achieved.

This embodiment can be implemented in appropriate combination with any of the structures described in the other embodiments.

Embodiment 3

A liquid crystal display device having a display function can be manufactured by manufacturing transistors and using the transistors for a pixel portion and further for a driver circuit. Furthermore, part or the whole of the driver circuit can be formed over the same substrate as the pixel portion, using the transistor, whereby a system-on-panel can be obtained.

The liquid crystal display device includes a liquid crystal element (also referred to as liquid crystal display element) as a display element.

Furthermore, a liquid crystal display device includes a panel in which a liquid crystal display element is sealed, and a module in which an IC or the like including a controller is mounted on the panel. One embodiment of the present invention also relates to an element substrate, which corresponds to one mode in which the display element has not been completed in a manufacturing process of the liquid crystal display device, and the element substrate is provided with a means for supplying current to the display element in each of a plurality of pixels. Specifically, the element substrate may be in a state where it is provided only with a pixel electrode of the display element, in a state where a conductive film to be a pixel electrode has been formed and the conductive film has not yet been etched to form the pixel electrode, or in any other state.

Note that a liquid crystal display device in this specification means an image display device, a display device, or a light source (including a lighting device). Furthermore, the liquid crystal display device includes any of the following modules in its category: a module to which a connector such as a flexible printed circuit (FPC), tape automated bonding (TAB) tape, or a tape carrier package (TCP) is attached; a module having TAB tape or a TCP which is provided with a printed wiring board at the end thereof; and a module having an integrated circuit (IC) directly mounted on a display element by a chip on glass (COG) method.

The appearance and a cross section of a liquid crystal display panel, which is one embodiment of a liquid crystal display device, will be described with reference to FIGS. 4A1, 4A2, and 4B. FIGS. 4A1 and 4A2 are each a top view of a panel in which transistors 4010 and 4011 formed over a first substrate 4001 and a liquid crystal element 4013 are sealed between the first substrate 4001 and a second substrate 4006 with a sealant 4005. FIG. 4B is a cross-sectional view taken along the line M-N of FIGS. 4A1 and 4A2.

The sealant 4005 is provided to surround a pixel portion 4002 and a scan line driver circuit 4004 that are provided over the first substrate 4001. The second substrate 4006 is provided over the pixel portion 4002 and the scan line driver circuit 4004. Therefore, the pixel portion 4002 and the scan line driver circuit 4004 are sealed together with a liquid crystal composition 4008, by the first substrate 4001, the sealant 4005, and the second substrate 4006.

In FIG. 4A1, a signal line driver circuit 4003 that is formed using a single crystal semiconductor film or a polycrystalline semiconductor film over a substrate separately prepared is mounted in a region different from the region surrounded by the sealant 4005 over the first substrate 4001. Note that 4A2 illustrates an example in which part of the signal line driver circuit is formed using a transistor provided over the first substrate 4001. A signal line driver circuit 4003b is formed over the first substrate 4001, and a signal line driver circuit 4003a formed using a single crystal semiconductor film or a polycrystalline semiconductor film is mounted on a substrate separately prepared.

Note that there is no particular limitation on the connection method of a driver circuit which is separately formed, and COG, wire bonding, TAB, or the like can be used. FIG. 4A1 illustrates an example of mounting the signal line driver circuit 4003 by COG, and FIG. 4A2 illustrates an example of mounting the signal line driver circuit 4003 by TAB.

The pixel portion 4002 and the scan line driver circuit 4004 provided over the first substrate 4001 each include a plurality of transistors. FIG. 4B illustrates the transistor 4010 included in the pixel portion 4002 and the transistor 4011 included in the scan line driver circuit 4004. An insulating layer 4020 and an interlayer film 4021 are provided over the transistors 4010 and 4011.

As the transistors 4010 and 4011, the transistor which is described in Embodiment 2 or 3 can be employed.

Furthermore, a conductive layer may be provided over the interlayer film 4021 or the insulating layer 4020 so as to overlap with a channel formation region of a semiconductor layer of the transistor 4011 for the driver circuit. The conductive layer may have the same potential as or a potential different from that of a gate electrode layer of the transistor 4011 and can function as a second gate electrode layer. Furthermore, the potential of the conductive layer may be GND or the conductive layer may be in a floating state.

A pixel electrode layer 4030 and a common electrode layer 4031 are provided over the interlayer film 4021, and the pixel electrode layer 4030 is electrically connected to the transistor 4010. The liquid crystal element 4013 includes the pixel electrode layer 4030, the common electrode layer 4031, and the liquid crystal composition 4008. Note that a polarizing plate 4032a and a polarizing plate 4032b are provided on the outer sides of the first substrate 4001 and the second substrate 4006, respectively.

As the liquid crystal composition 4008, the liquid crystal composition according to Embodiment 1, which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum, is used. The liquid crystal composition 4008 may contain an organic resin.

The structures of the pixel electrode layer and the common electrode layer described in Embodiment 1 or 2 can be used for the pixel electrode layer 4030 and the common electrode layer 4031.

In this embodiment, as the liquid crystal composition 4008, the liquid crystal composition according to Embodiment 1, which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum, is used. The liquid crystal composition 4008 is provided in a liquid crystal display device with a blue phase exhibited (in a state where a blue phase appears) by being subjected to polymer stabilization treatment. Therefore, in this embodiment, the pixel electrode layer 4030 and the common electrode layer 4031 have opening patterns, as the electrode layers illustrated in FIG. 1 in Embodiment 1 or FIGS. 3A to 3D in Embodiment 2.

With an electric field generated between the pixel electrode layer 4030 and the common electrode layer 4031, liquid crystal of the liquid crystal composition 4008 is controlled. An electric field in the lateral direction is generated in the liquid crystal, so that liquid crystal molecules can be controlled using the electric field.

In the liquid crystal composition according to Embodiment 1, the peak of the diffracted wavelength on the longest wavelength side in the reflectance spectrum is less than or equal to 450 nm, preferably less than or equal to 420 nm, and the twisting power is strong. When the twisting power of the liquid crystal composition is strong, the transmittance of the liquid crystal composition at the time of no voltage application (at an applied voltage of 0 V) can be low, leading to a higher contrast of a liquid crystal display device including the liquid crystal composition as the liquid crystal composition 4008.

As the first substrate 4001 and the second substrate 4006, glass, plastic, or the like having a light-transmitting property can be used. As plastic, a polyvinyl fluoride (PVF) film, a polyester film, or an acrylic resin film can be used. Alternatively, a fiberglass-reinforced plastics (FRP) plate or a sheet with a structure in which an aluminum foil is sandwiched between PVF films or polyester films can be used.

A columnar spacer denoted by reference numeral 4035 is obtained by selective etching of an insulating film and is provided in order to control the thickness (a cell gap) of the liquid crystal composition 4008. Alternatively, a spherical spacer may be used. In the liquid crystal display device including the liquid crystal composition 4008, the cell gap which is the thickness of the liquid crystal composition is preferably greater than or equal to 1 μm and less than or equal to 20 μm. In this specification, the thickness of a cell gap refers to the maximum thickness (film thickness) of a liquid crystal composition.

Although FIGS. 4A1, 4A2, and 4B illustrate examples of transmissive liquid crystal display devices, one embodiment of the present invention can also be applied to a transflective liquid crystal display device and a reflective liquid crystal display device.

FIGS. 4A1, 4A2, and 4B illustrate examples of liquid crystal display devices in which a polarizing plate is provided on the outer side (the viewing side) of a substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

A color filter layer or a light-blocking layer may be formed as part of the interlayer film 4021. In FIGS. 4A1, 4A2, and 4B, a light-blocking layer 4034 is provided on the second substrate 4006 side so as to cover the transistors 4010 and 4011. By providing the light-blocking layer 4034, the contrast can be more increased and the transistors can be more stabilized.

The thin film transistors may be, but is not necessarily, covered with the insulating layer 4020 which functions as a protective film of the thin film transistors.

Note that the protective film is provided to prevent entry of contamination impurities such as an organic substance, metal, and moisture in the air and is preferably a dense film. The protective film may be formed by a sputtering method to have a single-layer structure or a layered structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Furthermore, in the case of further forming a light-transmitting insulating layer as a planarizing insulating film, the light-transmitting insulating layer can be formed using an organic material having heat resistance, such as polyimide, acrylic, a benzocyclobutene-based resin, polyamide, or epoxy. Other than such organic materials, it is possible to use a low-dielectric constant material (a low-k material), a siloxane-based resin, PSG (phosphosilicate glass), BPSG (borophosphosilicate glass), or the like. The insulating layer may be formed by stacking a plurality of insulating films formed using any of these materials.

There is no particular limitation on the method for forming the interlayer layer, and the following method can be employed depending on the material: spin coating, dip coating, spray coating, a droplet discharging method (e.g., an ink-jet method), screen printing, offset printing, roll coating, curtain coating, knife coating, or the like.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

The pixel electrode layer 4030 and the common electrode layer 4031 can be formed of one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The pixel electrode layer 4030 and the common electrode layer 4031 can be formed using a conductive composition including a conductive macromolecule (also referred to as conductive polymer).

Furthermore, a variety of signals and potentials are supplied to the signal line driver circuit 4003 which is formed separately, the scan line driver circuit 4004, or the pixel portion 4002 from an FPC 4018.

Furthermore, since the transistor is easily broken by static electricity or the like, a protective circuit for protecting the driver circuits is preferably provided over the same substrate as a gate line or a source line. The protective circuit is preferably formed using a nonlinear element.

In FIGS. 4A1, 4A2, and 4B, a connection terminal electrode 4015 is formed using the same conductive film as the pixel electrode layer 4030, and a terminal electrode 4016 is formed using the same conductive film as source electrode layers and drain electrode layers of the transistors 4010 and 4011.

The connection terminal electrode 4015 is electrically connected to a terminal of the FPC 4018 through an anisotropic conductive film 4019.

Although FIGS. 4A1, 4A2, and 4B illustrate an examples in which the signal line driver circuit 4003 is formed separately and mounted on the first substrate 4001, one embodiment of the present invention is not limited to this structure. The scan line driver circuit may be separately formed and then mounted, or only part of the signal line driver circuit or part of the scan line driver circuit may be separately formed and then mounted.

As described above, higher contrast can be achieved with the use of a liquid crystal composition which exhibits a blue phase, contains a chiral agent and liquid crystal containing a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween, and has a peak of the diffracted wavelength of 450 nm or less, preferably 420 nm or less on the longest wavelength side in the reflectance spectrum. Accordingly, it is possible to provide a liquid crystal display device having a high level of visibility and high image quality.

The above-described liquid crystal composition is capable of high-speed response. Thus, a high-performance liquid crystal display device can be achieved.

This embodiment can be implemented in appropriate combination with any of the structures described in the other embodiments.

Embodiment 4

The liquid crystal display device disclosed in this specification can be applied to a variety of electronic devices (including game machines). Examples of electronic devices include a television set (also referred to as television or television receiver), a monitor of a computer or the like, cameras such as a digital camera and a digital video camera, a digital photo frame, a mobile phone handset (also referred to as mobile phone or mobile phone device), a portable game machine, a personal digital assistant, an audio reproducing device, a large-sized game machine such as a pachinko machine, and the like.

Figure 5A:
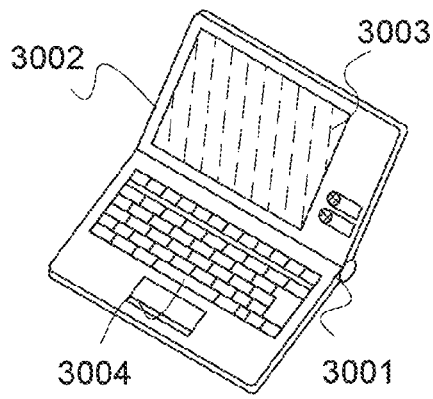
FIGS. 5A to 5F illustrate electronic devices.

FIG. 5A illustrates a laptop personal computer which includes a main body 3001, a housing 3002, a display portion 3003, a keyboard 3004, and the like. When the liquid crystal display device described in any of Embodiments 1 to 3 is used for the display portion 3003, the laptop personal computer can have high contrast, a high level of visibility, and high reliability.

Figure 5B:
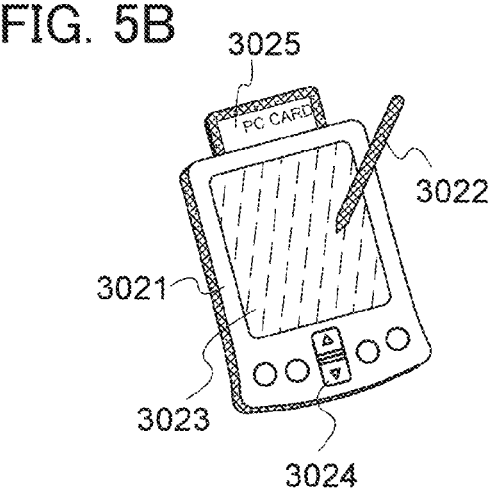

FIG. 5B illustrates a personal digital assistant (PDA) which includes a main body 3021 provided with a display portion 3023, an external interface 3025, operation buttons 3024, and the like. A stylus 3022 is included as an accessory for operation. When the liquid crystal display device described in any of Embodiments 1 to 3 is used for the display portion 3023, the personal digital assistant (PDA) can have high contrast, a high level of visibility, and high reliability.

Figure 5C:
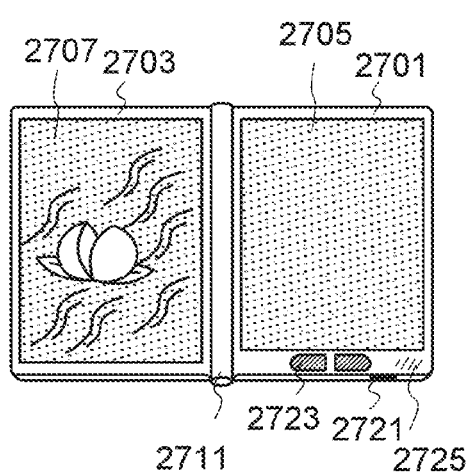

FIG. 5C illustrates an electronic book reader which includes two housings, i.e., a housing 2701 and a housing 2703. The housing 2701 and the housing 2703 are combined with a hinge 2711 so that the electronic book reader can be opened and closed with the hinge 2711 as an axis. With such a structure, the electronic book reader can operate like a paper book.

A display portion 2705 and a display portion 2707 are incorporated in the housing 2701 and the housing 2703, respectively. The display portion 2705 and the display portion 2707 may display one image or different images. In the structure where different images are displayed on different display portions, for example, text can be displayed on the right display portion (the display portion 2705 in FIG. 5C) and images can be displayed on the left display portion (the display portion 2707 in FIG. 5C). When the liquid crystal display device described in any of Embodiments 1 to 3 is used for the display portions 2705 and 2707, the electronic book reader can have high contrast, a high level of visibility, and high reliability. In the case where a transflective or reflective liquid crystal display device is used as the display portion 2705, the electronic book reader may be used in a comparatively bright environment; therefore, a solar cell may be provided so that power generation by the solar cell and charge by a battery can be performed. When a lithium ion battery is used as the battery, there are advantages of downsizing and the like.

FIG. 5C illustrates an example in which the housing 2701 is provided with an operation portion and the like. For example, the housing 2701 is provided with a power switch 2721, operation keys 2723, a speaker 2725, and the like. With the operation keys 2723, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Moreover, the electronic book reader may have a function of an electronic dictionary.

The electronic book reader may have a structure capable of wirelessly transmitting and receiving data. Through wireless communication, desired book data or the like can be purchased and downloaded from an electronic book server.

Figure 5D:
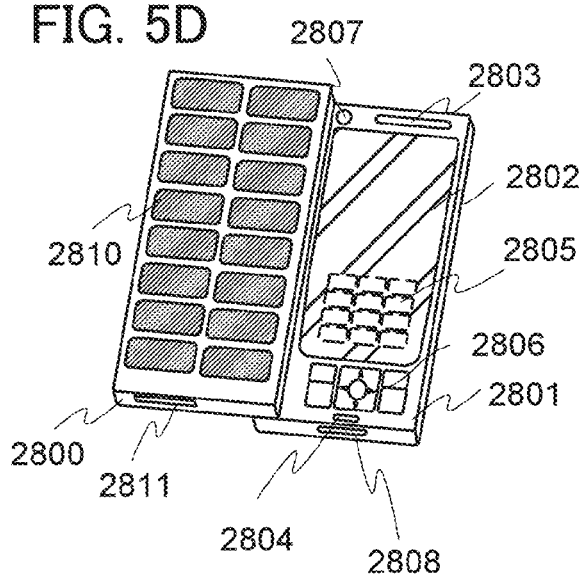

FIG. 5D illustrates a mobile phone, which includes two housings, i.e., a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 having a function of charge of the mobile phone, an external memory slot 2811, and the like. An antenna is incorporated in the housing 2801. When the liquid crystal display device described in any of Embodiments 1 to 3 is used for the display panel 2802, the mobile phone can have high contrast, a high level of visibility, and high reliability.

Furthermore, the display panel 2802 is provided with a touch panel. A plurality of operation keys 2805 which is displayed as images is illustrated by dashed lines in FIG. 5D. Note that a boosting circuit by which a voltage output from the solar cell 2810 is increased to be sufficiently high for each circuit is also provided.

On the display panel 2802, the display direction can be appropriately changed depending on a usage pattern. The mobile phone is provided with the camera lens 2807 on the same surface as the display panel 2802, and thus it can be used as a videophone. The speaker 2803 and the microphone 2804 can be used for videophone calls, recording and playing sound, and the like as well as voice calls. Furthermore, the housings 2800 and 2801 which are developed as illustrated in FIG. 5D can overlap with each other by sliding; thus, the size of the mobile phone can be decreased, which makes the mobile phone suitable for being carried.

The external connection terminal 2808 can be connected to an AC adapter and various types of cables such as a USB cable, and charging and data communication with a personal computer are possible. Moreover, a large amount of data can be stored and can be moved by inserting a storage medium into the external memory slot 2811.

Furthermore, in addition to the above functions, an infrared communication function, a television reception function, or the like may be provided.

Figure 5E:
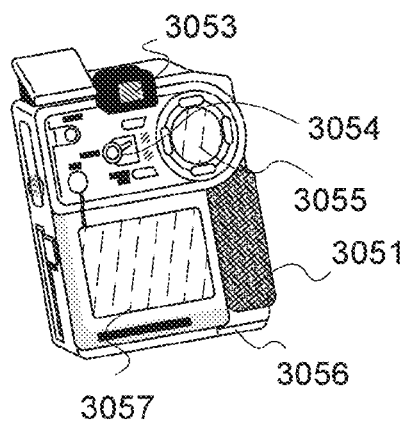

FIG. 5E illustrates a digital video camera which includes a main body 3051, a display portion A 3057, an eyepiece portion 3053, an operation switch 3054, a display portion B 3055, a battery 3056, and the like. When the liquid crystal display device described in any of Embodiments 1 to 3 is used for the display portion A 3057 and the display portion B 3055, the digital video camera can have high contrast, a high level of visibility, and high reliability.

Figure 5F:
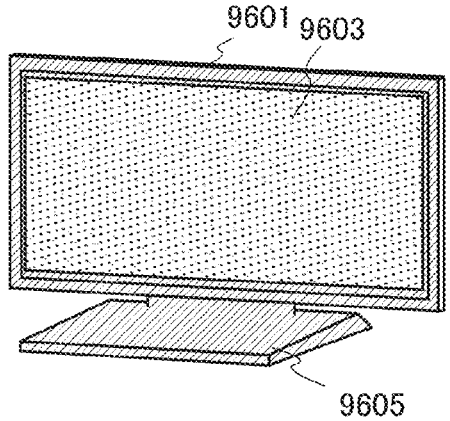

FIG. 5F illustrates a television set. The television set includes a housing 9601, a display portion 9603, and the like. The display portion 9603 can display images. Here, the housing 9601 is supported by a stand 9605. When the liquid crystal display device described in any of Embodiments 1 to 3 is used for the display portion 9603, the television set can have high contrast, a high level of visibility, and high reliability.

The television set can be operated by an operation switch of the housing 9601 or a separate remote controller. Furthermore, the remote controller may be provided with a display portion for displaying data output from the remote controller.

Note that the television set is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) data communication can be performed.

This embodiment can be implemented in appropriate combination with any of the structures described in the other embodiments.

Example 1

In this example, liquid crystal elements (example samples 1A, 2A, 1B, and 2B) were manufactured with the use of liquid crystal compositions each according to one embodiment of the present invention, and liquid crystal elements (comparative example samples A and B) were manufactured as comparative examples with the use of liquid crystal compositions to which the embodiments of the present invention are not applied. Then, the characteristics of these elements were evaluated.

Table 1 shows the components of the liquid crystal compositions contained in the liquid crystal elements (the example samples 1A, 2A, 1B, and 2B and the comparative example samples A and B) manufactured in this example. In Table 1, the percentages (mixture ratios) are all indicated by weight. The example samples 1A and 2A and the comparative example sample A are liquid crystal elements containing liquid crystal compositions each containing liquid crystal and a chiral agent. The example samples 1B and 2B and the comparative example sample B are liquid crystal elements containing liquid crystal compositions obtained by adding polymerizable monomers and polymerization initiators to the example samples 1A and 2A and the comparative example sample A.

TABLE 1

| Sample | | example sample 1B | example sample 2B | comparative example sample B | Ratio(wt %) | |
|---|---|---|---|---|---|---|
| Polymerization initiator | | | DMPAP | | | 0.3 |
| Polymerizable monomer | | | DMeAc | | 4 | |
| | | | RM257 | | 4 | |

| | Sample | example sample 1A | example sample 2A | comparative example sample A | | |
|---|---|---|---|---|---|---|
| Liquid crystal | CPEP-5FCNF | 30 | 30 | 30 | 90.5 | 99.7 |
| | PEP-3FCF3F | 15 | 20 | 0 | | 92 |
| | CPEP-5CNF | 5 | 0 | 20 | | |
| | PEP-3CNF | 10 | 10 | 10 | | |
| | E-8 | 40 | 40 | 40 | | |
| Chiral agent | | | ISO (6OBA)$_2$ | | 9.5 | |

In the example samples 1A, 2A, 1B, and 2B and the comparative example samples A and B, as a chiral agent, 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.) was used; and for liquid crystal, liquid crystal mixture E-8 (produced by LCC Corporation), 4-cyano-3,5-difluorophenyl 4-(trans-4-n-pentylcyclohexyl)benzoate (abbreviation: CPEP-5FCNF) represented by the structural formula (103), and 4-cyano-3-fluorophenyl 4-n-propylbenzoate (abbreviation: PEP-3CNF) represented by the structural formula (114) were used.

Furthermore, 3,5-difluoro-4-trifluoromethylphenyl 4-n-propylbenzoate (abbreviation: PEP-3FCF3F) represented by the structural formula (150) and 4-cyano-3-fluorophenyl 4-(trans-4-n-pentylcyclohexyl)benzoate (abbreviation: CPEP-5CNF) represented by the structural formula (113) were used for liquid crystal in the example samples 1A and 1B, PEP-3FCF3F (abbreviation) was used for liquid crystal in the example samples 2A and 2B, and CPEP-5CNF (abbreviation) was used for liquid crystal in the comparative example samples A and B.

PEP-3FCF3F (abbreviation) represented by the structural formula (150) is a compound having three electron-withdrawing groups as end groups of a structure where a plurality of rings including at least one aromatic ring is linked to each other directly or with a linking group laid therebetween; at least one of the three electron-withdrawing groups includes a trifluoromethyl group. PEP-3FCF3F (abbreviation) represented by the structural formula (150) is a compound of one embodiment of the invention disclosed in this specification. A liquid crystal composition including the compound and a liquid crystal display device including the liquid crystal composition are each one embodiment of the invention disclosed in this specification. The structural formula of PEP-3FCF3F (abbreviation) is shown below.

(150)

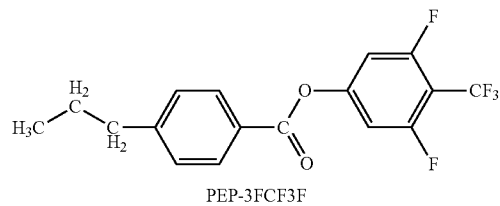

PEP-3FCF3F

In the example samples 1B and 2B and the comparative example sample B, dodecyl methacrylate (abbreviation: DMeAc) (produced by Tokyo Chemical Industry Co., Ltd.), which is non-liquid crystalline and UV-polymerizable, and RM257 (produced by SYNTHON Chemicals GmbH & Co. KG), which is liquid crystalline and UV-polymerizable, were used as polymerizable monomers. As a polymerization initiator, DMPAP (abbreviation) (produced by Tokyo Chemical Industry Co., Ltd.) was used.

In the liquid crystal compositions of the example samples 1B and 2B and the comparative example sample B, the proportion of the liquid crystal was 90.5 wt % and the proportion of the chiral agent was 9.5 wt %. In the liquid crystal compositions of the example samples 1B and 2B and the comparative example sample B, the proportion of the liquid crystal and the chiral agent was 92 wt % and the proportion of the polymerizable monomers was 8 wt % (the proportion of DMeAc was 4 wt % and the proportion of RM257 was 4 wt %). Furthermore, in the liquid crystal compositions of the example samples 1B and 2B and the comparative example sample B, the proportion of the liquid crystal, the chiral agent, and the polymerizable monomers was 99.7 wt % and the proportion of the polymerization initiator was 0.3 wt %.

Note that the compound (PEP-3FCF3F (abbreviation)) having three electron-withdrawing groups (at least one of the three electron-withdrawing groups includes a trifluoromethyl group) as end groups of a structure where a plurality of rings including at least one aromatic ring is linked to each other directly or with a linking group laid therebetween, has a proportion of 15 wt % in liquid crystal contained in the example samples 1A and 1B and a proportion of 20 wt % in liquid crystal contained in the example samples 2A and 2B. Note that the compound (PEP-3FCF3F (abbreviation)) having three electron-withdrawing groups (at least one of the three electron-withdrawing groups includes a trifluoromethyl group) as end groups of a structure where a plurality of rings including at least one aromatic ring is linked to each other directly or with a linking group laid therebetween, was not contained in liquid crystal in the comparative example samples A and B.

Note that the structural formulae of CPEP-5FCNF (abbreviation), CPEP-5CNF (abbreviation), PEP-3CNF (abbreviation), RM257 (produced by SYNTHON Chemicals GmbH & Co. KG), dodecyl methacrylate (abbreviation: DMeAc) (produced by Tokyo Chemical Industry Co., Ltd.), DMPAP (abbreviation) (produced by Tokyo Chemical Industry Co., Ltd.), and ISO-(6OBA)$_2$ (abbreviation) (produced by Midori Kagaku Co., Ltd.), which were used in this example, are shown below.

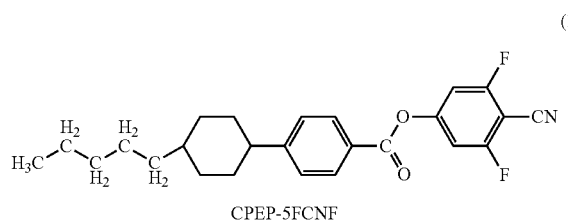

CPEP-5FCNF (103)

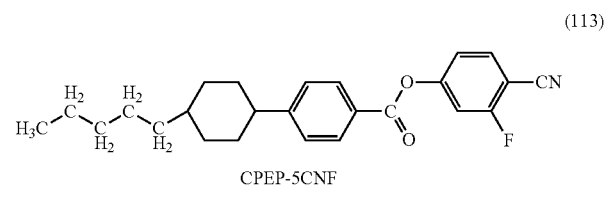

CPEP-5CNF (113)

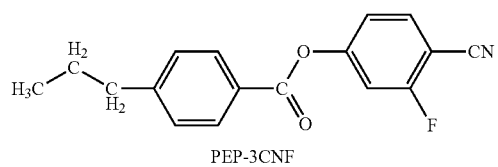

PEP-3CNF (114)

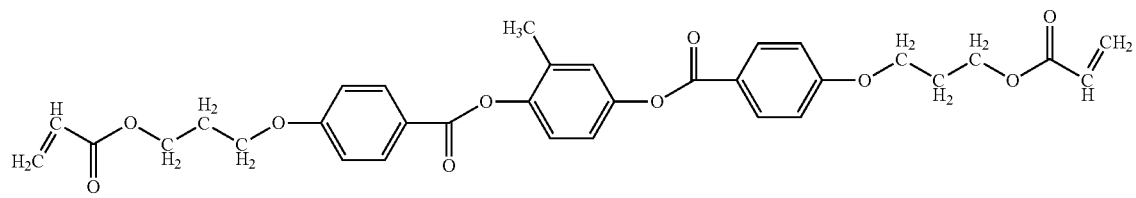

RM257

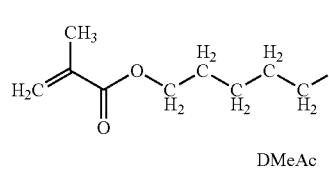

DMeAc

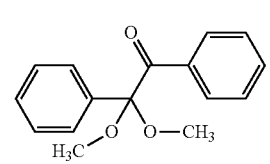

DMPAP

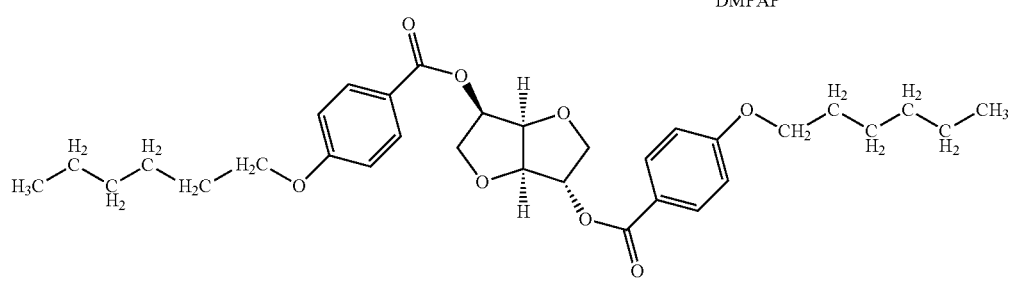

The liquid crystal elements of the example samples 1A, 2A, 1B, and 2B and the comparative example samples A and B were each manufactured in such a manner that a glass substrate over which a pixel electrode layer and a common electrode layer were formed in comb-like shapes as in FIG. 3D and a glass substrate serving as a counter substrate were bonded to each other using sealant with a space (4 μm) provided therebetween and then a liquid crystal composition obtained by mixing materials in Table 1 stirred in an isotropic phase at a ratio shown in Table 1 was injected between the substrates by an injection method.

The pixel electrode layer and the common electrode layer were formed using indium tin oxide containing silicon oxide (ITSO) by a sputtering method. The thickness of each of the pixel electrode layer and the common electrode layer was 110 nm, the width thereof was 2 μm, and the distance between the pixel electrode layer and the common electrode layer was 2 μm. Furthermore, an ultraviolet light and heat curable sealant was used as the sealant. As curing treatment, ultraviolet irradiation was performed at an irradiance of 100 mW/cm$^2$ for 90 seconds, and then, heat treatment was performed at 120° C. for 1 hour.

The reflectance spectra of the liquid crystal compositions in the liquid crystal elements of the example samples 1A and 2A and the comparative example sample A were evaluated. The evaluation was performed using a polarizing microscope (MX-61L produced by Olympus Corporation), a temperature controller (HCS302-MK1000 produced by Instec, Inc.), and a microspectroscope (LVmicroUV/VIS produced by Lambda Vision Inc.).

First, the liquid crystal compositions in the liquid crystal elements of the example samples 1A and 2A and the comparative example sample A were made to exhibit an isotropic phase. Then, the liquid crystal compositions were observed with the polarizing microscope while the temperature was decreased by 1.0° C. per minute with the temperature controller. In this manner, the temperature range where the liquid crystal compositions exhibit a blue phase was measured.

The measurement conditions of the observation were as follows. In the polarizing microscope, a measurement mode was a reflective mode; polarizers were in crossed nicols; and the magnification was 50 times to 200 times.

Next, each of the liquid crystal elements of the example samples 1A and 2A and the comparative example sample A was set at a given constant temperature within the temperature range where a blue phase appears, and the spectra of the intensity of reflected light from the liquid crystal compositions were measured with the microspectroscope.

The measurement conditions of the microspectroscope were as follows. A measurement mode was a reflective mode; polarizers were in crossed nicols; the measurement area was 12 μmφ; and the measurement wavelength was 250 nm to 800 nm. Since the measurement area is small, for the measurement, an area where the color of a blue phase had a long wavelength was determined with a monitor of the microspectroscope. Note that the measurement was performed from the side of the glass substrate serving as the counter substrate, over which the pixel electrode layer and the common electrode layer were not formed, in order to avoid an influence of the electrode layers in measurement.

Figure 6:
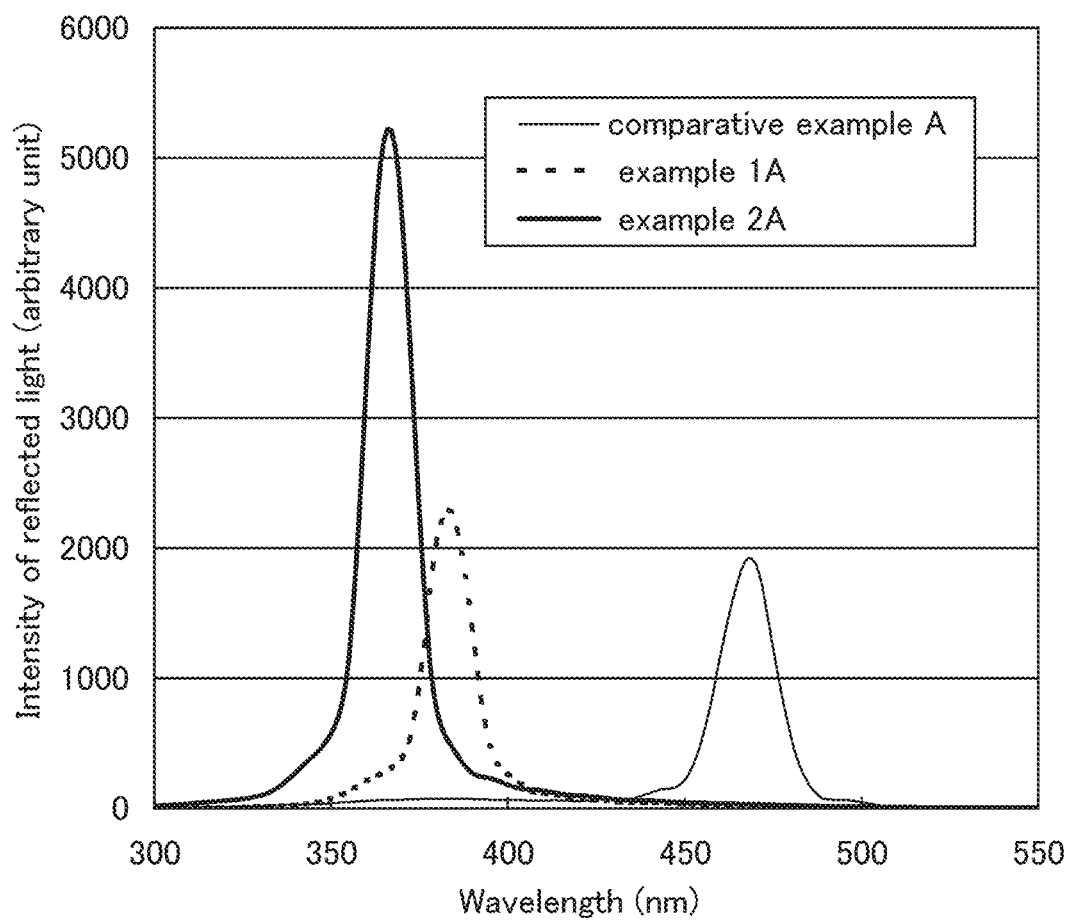
FIG. 6 shows reflectance spectra of liquid crystal compositions.

FIG. 6 shows the spectra of the intensity of reflected light from the liquid crystal compositions in the liquid crystal elements of the example samples 1A and 2A and the comparative example sample A (the spectrum of the liquid crystal composition in the example sample 1A is represented by a thick dotted line, the spectrum of the liquid crystal composition in the example sample 2A is represented by a thick solid line, and the spectrum of the liquid crystal composition in the comparative example sample A is represented by a thin solid line). The peaks of the diffracted wavelengths on the longest wavelength side in the reflectance spectra of the liquid crystal compositions of the liquid crystal elements of the example samples 1A and 2A and the comparative example sample A were detected.

Also in this example, the detected peak of the diffracted wavelength in the reflectance spectrum has the maximum value and is on the longest wavelength side among peaks.

The peaks of the diffracted wavelengths on the longest wavelength side in the reflectance spectra of the liquid crystal compositions were 383 nm in the example sample 1A which is one embodiment of the present invention, 366 nm in the example sample 2A which is one embodiment of the present invention. That is, the peaks of the diffracted wavelengths in the reflectance spectra of the liquid crystal compositions in the example samples 1A and 2A were less than or equal to 420 nm. Thus, the peaks of the diffracted wavelengths in the reflectance spectra of the liquid crystal compositions of the liquid crystal elements of the example samples 1A and 2A which contain PEP-3FCF3F (abbreviation) were less than or equal to 420 nm. Note that PEP-3FCF3F is a compound having three electron-withdrawing groups (at least one of the three electron-withdrawing groups includes a trifluoromethyl group) as end groups of a structure where a plurality of rings including at least one aromatic ring is linked to each other directly or with a linking group laid therebetween. This result reveals that the twisting power of the liquid crystal compositions is strong.

On the other hand, the peak of the diffracted wavelength on the longest wavelength side in the reflectance spectrum of the comparative example sample A was 469 nm which is a longer wavelength than 450 nm. This result reveals that the twisting power of the liquid crystal composition is weaker than those of the example samples.

The liquid crystal elements of the example samples 1B and 2B and the comparative example sample B were subjected to polymer stabilization treatment. The polymer stabilization treatment was performed in such a manner that the liquid crystal compositions of the liquid crystal elements of, the example samples 1B and 2B and the comparative example sample B, were set at a given constant temperature within the temperature range where a blue phase appears, and ultraviolet light (peak wavelength of 365 nm, irradiance of 1.5 mW/cm$^2$) irradiation was performed for 30 minutes. Through the polymer stabilization treatment, the polymerizable monomers in the liquid crystal compositions in the example samples 1B and 2B and the comparative example sample B polymerized, so that the liquid crystal elements containing the liquid crystal compositions containing an organic resin were formed as the example samples 1B and 2B and the comparative example sample B.

Next, in the liquid crystal elements of the example samples 1B and 2B and the comparative example sample B which contain the liquid crystal compositions and which were which were subjected to the polymer stabilization treatment, the spectra of the intensity of reflected light from the liquid crystal compositions were measured at room temperature with the microspectroscope.

Figure 7:
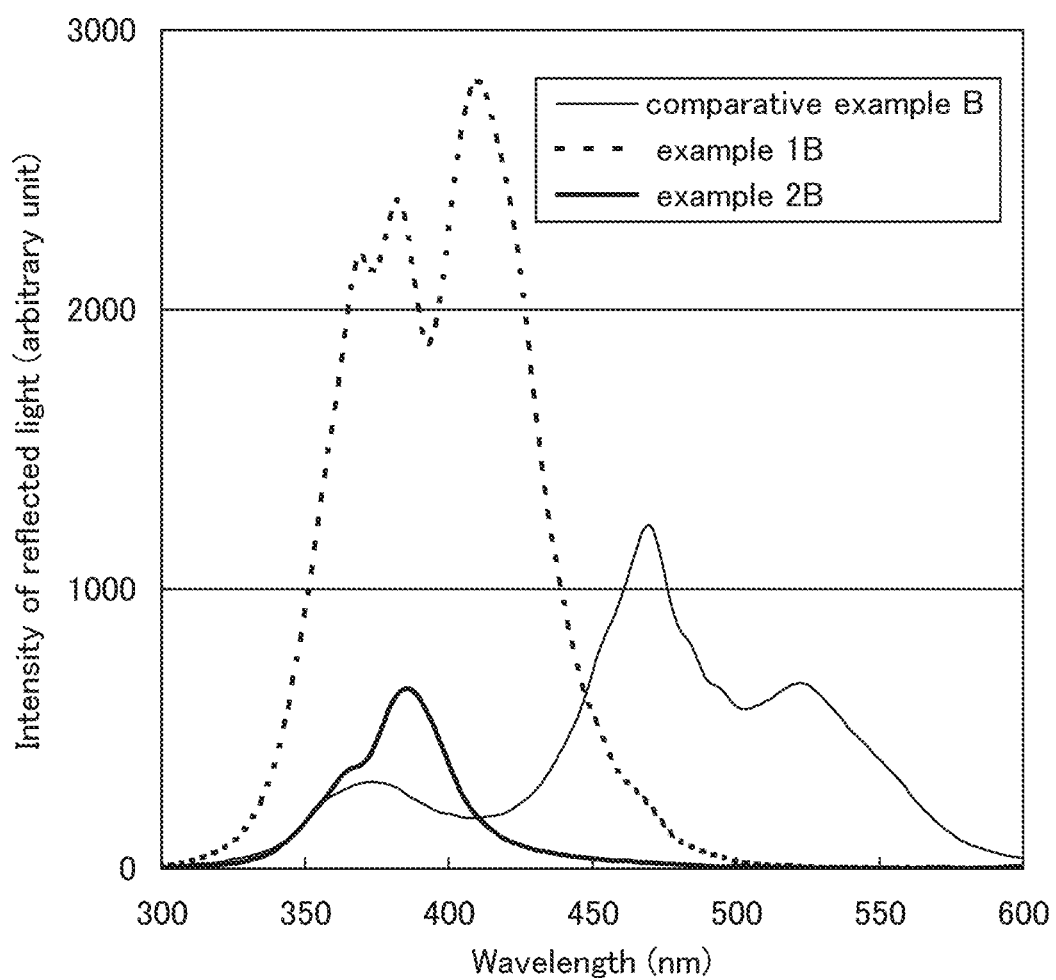
FIG. 7 shows reflectance spectra of liquid crystal compositions.

FIG. 7 shows the spectra of the intensity of reflected light from the liquid crystal compositions of the liquid crystal elements of the example samples 1B and 2B and the comparative example sample B (the spectrum of the liquid crystal composition in the example sample 1B is represented by a thick dotted line, the spectrum of the liquid crystal composition in the example sample 2B is represented by a thick solid line, and the spectrum of the liquid crystal composition in the comparative example sample B is represented by a thin solid line). The peaks of the diffracted wavelengths on the longest wavelength side in the reflectance spectra of the liquid crystal compositions in the liquid crystal elements of the example samples 1B and 2B and the comparative example sample B were detected.

The peaks of the diffracted wavelengths on the longest wavelength side in the reflectance spectra were 410 nm in the example sample 1B which is one embodiment of the present invention, and 385 nm in the example sample 2B which is one embodiment of the present invention. That is, the peaks of the diffracted wavelengths in the reflectance spectra of the liquid crystal composition in the example samples 1B and 2B were less than or equal to 420 nm. Thus, the peaks of the diffracted wavelengths in the reflectance spectra of the liquid crystal compositions of the liquid crystal elements which were subjected to the polymer stabilization treatment were also less than or equal to 420 nm. This result reveals that the twisting power of the liquid crystal compositions of the example samples 1B and 2B containing PEP-3FCF3F (abbreviation) which are compounds each having three electron-withdrawing groups (at least one of the three electron-withdrawing groups includes a trifluoromethyl group) as end groups of a structure where a plurality of rings including at least one aromatic ring is linked to each other directly or with a linking group laid therebetween, is strong.

On the other hand, the peak of the diffracted wavelength on the longest wavelength side in the reflectance spectrum of the liquid crystal composition in the comparative example sample B was 523 nm which is a longer wavelength than 450 nm. This result reveals that the twisting power of the liquid crystal composition in the liquid crystal element which was subjected to the polymer stabilization treatment is also weak.

Furthermore, voltage was applied to the liquid crystal elements of the example samples 1B and 2B and the comparative example sample B, and the properties of the transmittance and the contrast with respect to the applied voltage were evaluated. The properties were evaluated using liquid crystal evaluation equipment (an RETS100+VT measurement system produced by Otsuka Electronics Co., Ltd.) with the liquid crystal elements of the example samples 1B and 2B and the comparative example sample B sandwiched between polarizers in crossed nicols under the following conditions: a light source was a halogen lamp; and the temperature was room temperature.

Figure 8A:
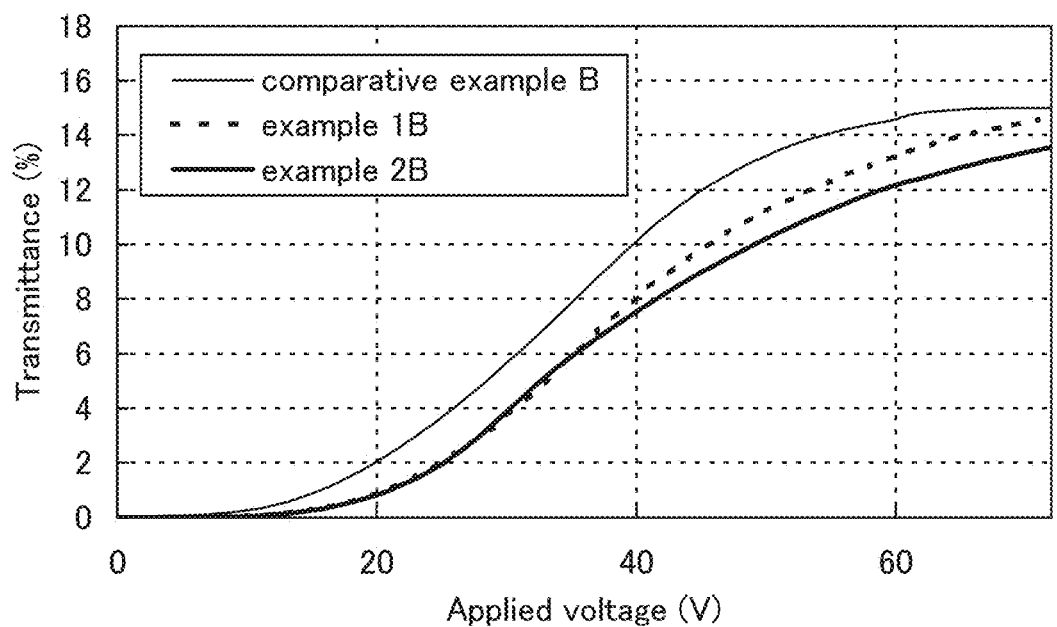
FIGS. 8A and 8B show the relations between applied voltage and transmittance of liquid crystal elements.
Figure 8B:
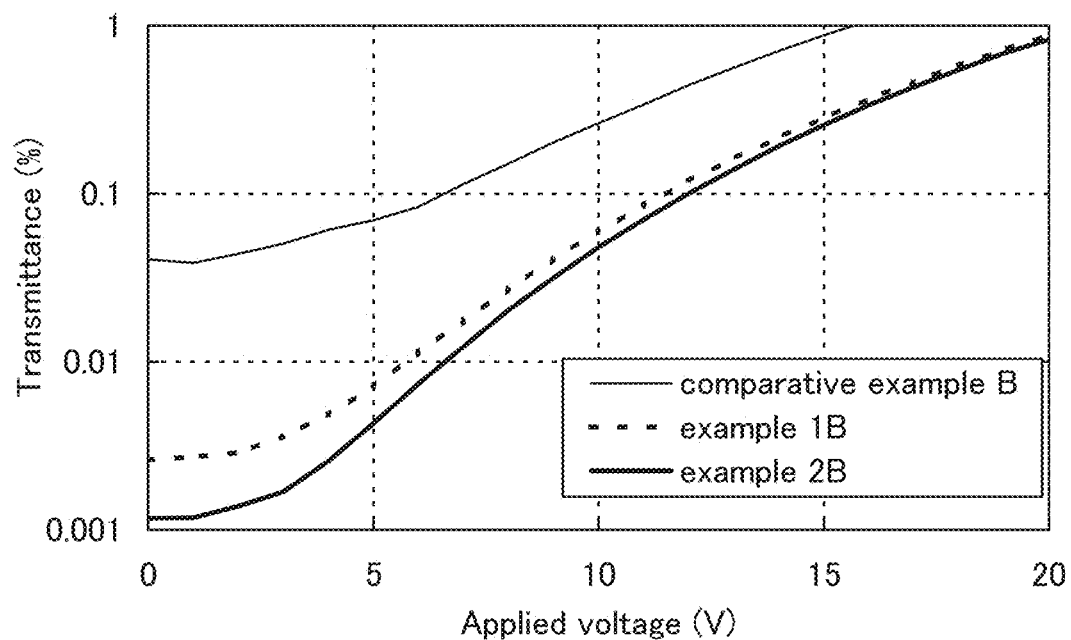
Figure 9:
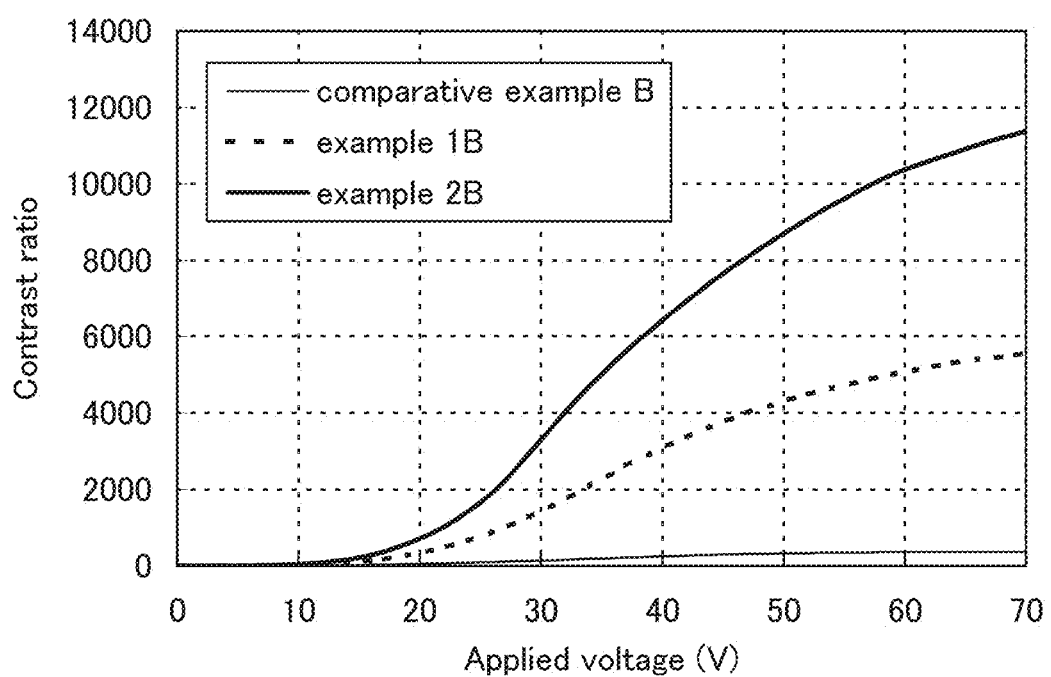
FIG. 9 shows the relations between applied voltage and contrast ratio of liquid crystal elements.

FIGS. 8A and 8B show the relation between applied voltage and transmittance of the liquid crystal elements of the example samples 1B and 2B and the comparative example sample B. FIG. 9 shows the relation between applied voltage and contrast ratio of the liquid crystal elements of the example samples 1B and 2B and the comparative example sample B. The transmittance in FIGS. 8A and 8B is the ratio of the intensity of light through the liquid crystal element to the intensity of light from the light source. The contrast ratios with respect to the applied voltage in FIG. 9 were calculated from the transmittance in FIGS. 8A and 8B. Specifically, the contrast ratio at the time of no voltage application (at an applied voltage of 0 V) was assumed to be 1, and the transmittance at each applied voltage was divided by the transmittance at an applied voltage of 0 V. In this manner, the contrast ratio was calculated. Note that in FIGS. 8A and 8B and 9, the properties of the liquid crystal element of the example sample 1B are represented by a thick dotted line; the properties of the liquid crystal element of the example sample 2B are represented by a thick solid line; and the properties of the liquid crystal element of the comparative example sample B are represented by a thin solid line. FIG. 8B is an enlarged graph showing the range of the applied voltage of 0 V to 10 V in FIG. 8A.

As shown in FIGS. 8A and 8B, the transmittance of the liquid crystal elements of the example samples 1B and 2B at an applied voltage of 0 V is lower than that of the liquid crystal element of the comparative example sample B at an applied voltage of 0 V. The liquid crystal elements of the example samples 1B and 2B are remarkable different from the liquid crystal element of the comparative example sample B in the contrast ratio as shown in FIG. 9. At the same applied voltage, the contrast ratio of the liquid crystal elements of the example samples 1B and 2B is higher than that of the liquid crystal element of the comparative example sample B.

As described above, when the twisting power of the liquid crystal composition is strong, the transmittance of the liquid crystal composition at the time of no voltage application (at an applied voltage of 0 V) can be low, leading to a higher contrast of a liquid crystal display device including the liquid crystal composition.

Thus, with the use of the liquid crystal composition exhibiting a blue phase in this example, which is one embodiment of the present invention, a liquid crystal display device with higher contrast can be provided.

Example 2

Synthetic methods of CPEP-5FCNF (abbreviation), PEP-3FCF3F (abbreviation), CPEP-5CNF (abbreviation), and PEP-3CNF (abbreviation), which were used for Example 1, are described below.

Synthesis Method of 4-(trans-4-n-pentylcyclohexyl) benzoic acid 4-cyano-3,5-difluorophenyl ester (abbreviation: CPEP-5FCNF)

A synthetic scheme of CPEP-5FCNF represented by the structural formula (103) is shown in (A-1) below.

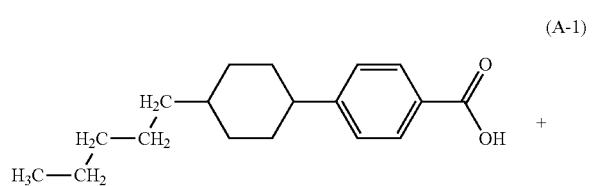

(A-1)

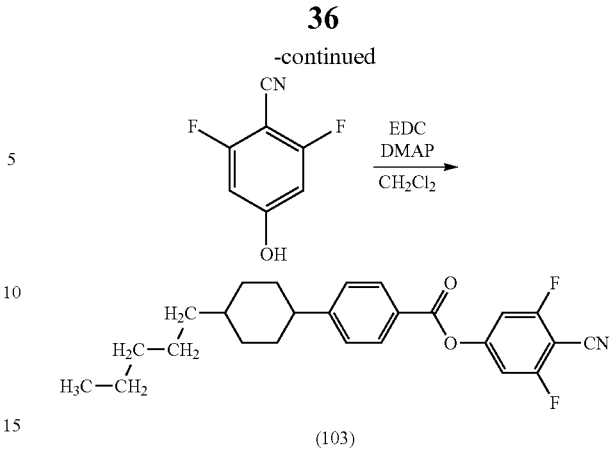

(103)

Into a 50-mL recovery flask were put 1.9 g (6.9 mmol) of 4-(trans-4-n-pentylcyclohexyl)benzoic acid, 1.1 g (7.1 mmol) of 2,6-difluoro-4-hydroxybenzonitrile, 0.13 mg (1.1 mmol) of 4-(N,N-dimethylamino)pyridine (DMAP), and 7.0 mL of dichloromethane, and stirring was performed. To this mixture, 1.5 g (7.8 mmol) of 1-ethyl-3-(3-dimethylaminopropyl)carbodiimide hydrochroride (EDC) was added, and stirring was performed in the air at room temperature for 28 hours. After a predetermined time, water was added to the obtained mixture, and an aqueous layer was extracted with dichloromethane. The obtained extracted solution was washed with a saturated saline together with the organic layer and then dried with magnesium sulfate. This mixture was separated by gravity filtration, and the filtrate was concentrated to give a solid. This solid was purified by silica gel column chromatography (developing solvent: toluene). The obtained fraction was concentrated to give a solid. This solid was purified by high performance liquid chromatography (HPLC) (developing solvent: chloroform).

The obtained fraction was concentrated to give 2.0 g of a white solid, which was a substance to be produced, in a yield of 69%. Then, 2.0 g of the obtained white solid was purified by a train sublimation method. In the purification by sublimation, the white solid was heated at 155° C. under a pressure of 2.7 Pa with a flow rate of argon gas of 5 mL/min. After the purification by sublimation, 1.8 g of a white solid was obtained in a collection rate of 90%.

This compound was identified as 4-(trans-4-n-pentylcyclohexyl)benzoic acid 4-cyano-3,5-difluorophenyl ester (abbreviation: CPEP-5FCNF), which was the substance to be produced, by nuclear magnetic resonance (NMR) spectroscopy.

Figure 10A:
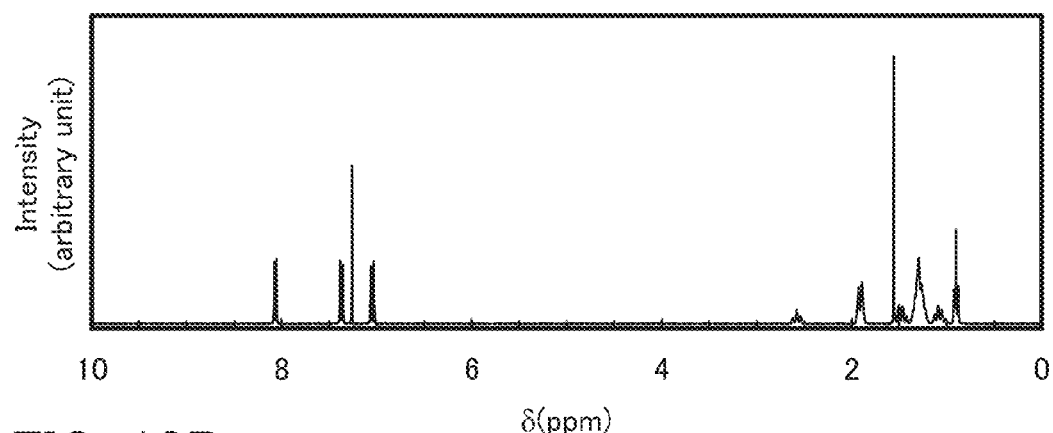
FIGS. 10A to 10C are $^1$H NMR charts of CPEP-5FCNF.
Figure 10B:
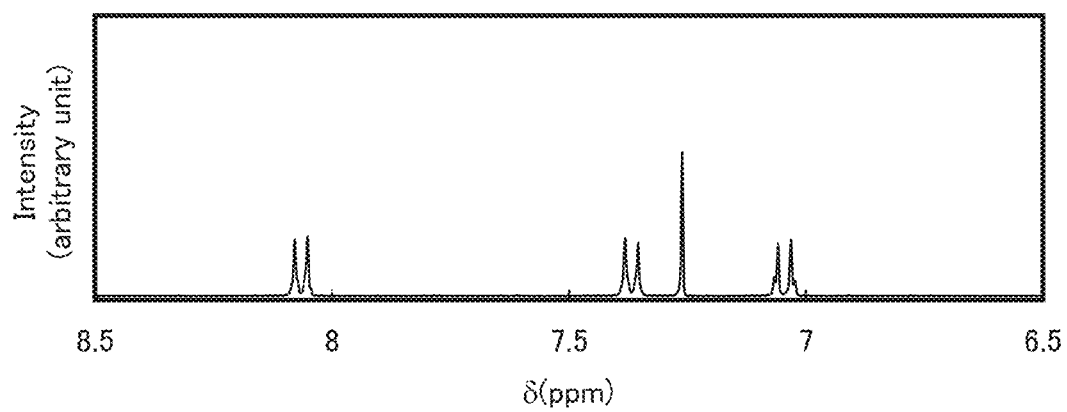
Figure 10C:
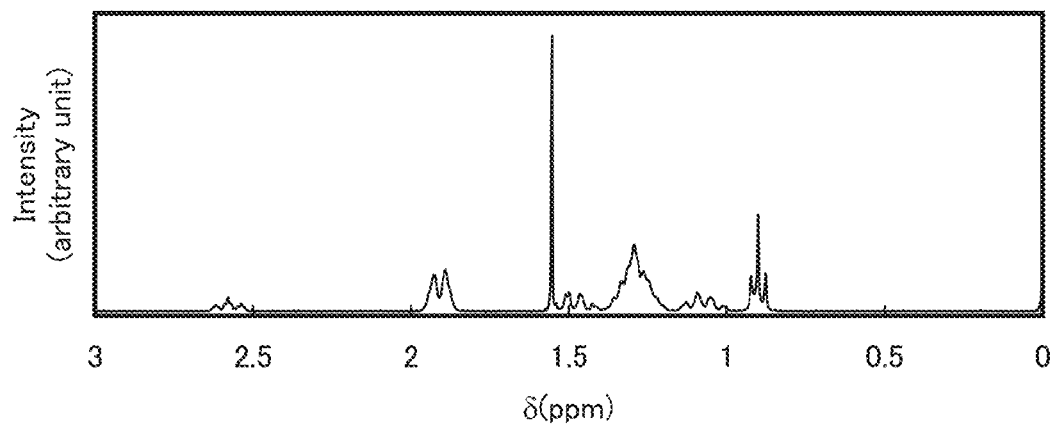

The $^1$H NMR data of the obtained substance (CPEP-5FCNF) is shown below. $^1$H NMR (CDCl$_3$, 300 MHz): δ (ppm)=0.90 (t, 3H), 1.02-1.13 (m, 2H), 1.20-1.35 (m, 9H), 1.43-1.54 (m, 2H), 1.89-1.93 (m, 4H), 2.54-2.62 (m, 1H), 7.05 (d, 2H), 7.37 (d, 2H), 8.06 (d, 2H). In addition, FIGS. 10A to 10C are the $^1$H NMR charts. Note that FIG. 10B is a chart showing an enlarged part of FIG. 10A in a range of 6.5 ppm to 8.5 ppm. FIG. 10C is a chart showing an enlarged part of FIG. 10A in a range of 0.0 ppm to 3.0 ppm.

Synthesis Method of 4-n-propylbenzoic acid 3,5-difluoro-4-(trifluoromethyl)phenyl (abbreviation: PEP-3FCF3F)

A synthesis scheme of PEP-3FCF3F represented by the structural formula (150) is shown in (Z-1) below.

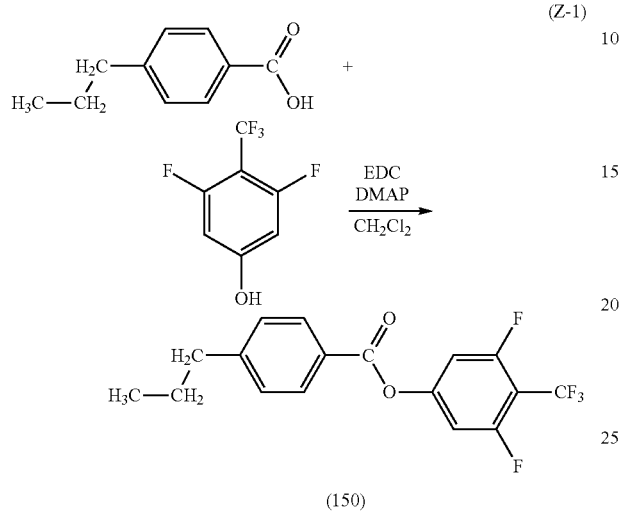

(150)

Into a 300-mL recovery flask were put 4.15 g (25.2 mmol) of 4-n-propylbenzoic acid, 5.00 g (25.2 mmol) of 3,5-difluoro-4-(trifluoromethyl)phenol, 460 mg (3.80 mmol) of 4-dimethylaminopyridine, and 100 mL of dichloromethane, and stirring was performed. To this mixture was added 5.32 g (27.7 mmol) of 1-ethyl-3-(3-dimethylaminopropyl)carbodiimide hydrochloride (EDC), and stirring was performed in the air at room temperature for 15 hours. After a predetermined time, water was added to the obtained mixture to extract an aqueous layer of this mixture with dichloromethane. The obtained extracted solution and an organic layer were combined and washed with a saturated aqueous solution of sodium hydrogen carbonate and saturated saline, and then, the organic layer was dried with magnesium sulfate. This mixture was separated by gravity filtration, and the filtrate was concentrated to give a white solid. This solid was purified by silica gel column chromatography (developing solvent: toluene). The resulting fraction was concentrated to give a white solid. This solid was purified by high performance liquid chromatography (HPLC) (developing solvent: chloroform). The obtained fraction was concentrated to give 7.11 g of a white solid, which was the substance to be produced, in a yield of 82.0%.

The obtained white solid was purified by a train sublimation method. In the purification by sublimation, the white solid was heated at 75° C. under a pressure of 2.8 Pa with a flow rate of argon gas of 10 mL/min. After the purification by sublimation, 2.02 g of a white solid was obtained in a collection rate of 28%.

This compound was identified as 3,5-difluoro-4-trifluoromethylphenyl 4-n-propylbenzoate (abbreviation: PEP-3FCF3F), which was the substance to be produced, by nuclear magnetic resonance (NMR) spectroscopy.

Figure 11A:
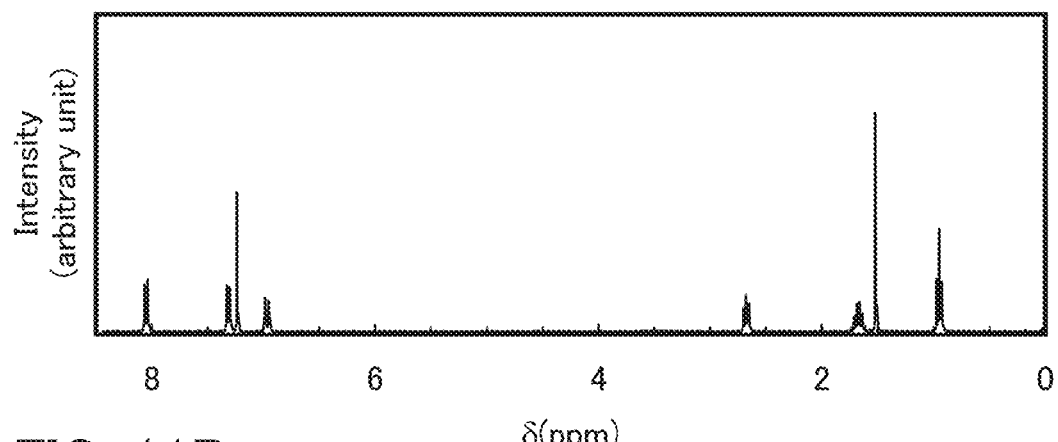
FIGS. 11A to 11C are $^1$H NMR charts of PEP-3FCF3F.
Figure 11B:
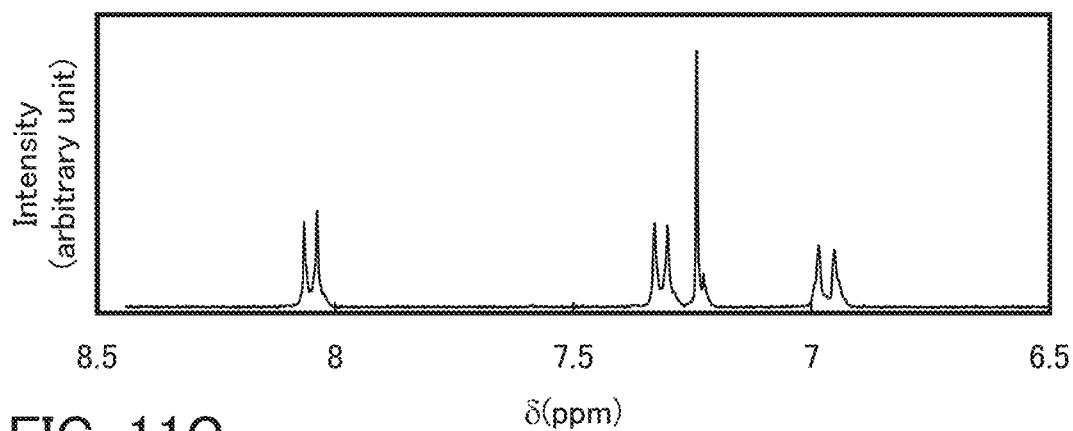
Figure 11C:
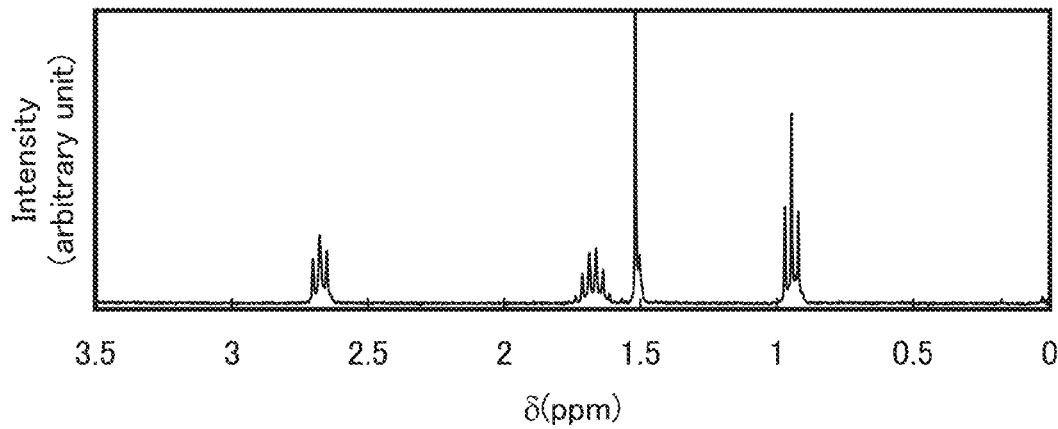

The $^1$H NMR data of the obtained substance (PEP-3FCF3F) is shown below. $^1$H NMR (CDCl$_3$, 300 MHz): δ (ppm)=0.95 (t, 3H), 1.68 (sext, 2H), 2.68 (t, 2H), 6.97 (d, 2H), 7.32 (d, 2H), 8.05 (d, 2H). In addition, FIGS. 11A to 11C are the $^1$H-NMR charts. Note that FIG. 11B is a chart showing an enlarged part of FIG. 11A in a range of 6.5 ppm to 8.5 ppm. FIG. 11C is a chart showing an enlarged part of FIG. 11A in a range of 0.0 ppm to 3.0 ppm.

Synthesis Method of 4-cyano-3-fluorophenyl 4-(trans-4-n-pentylcyclohexyl)benzoate (abbreviation: CPEP-5CNF)

A synthesis scheme of CPEP-5CNF represented by the structural formula (113) is shown in (F-1) below.

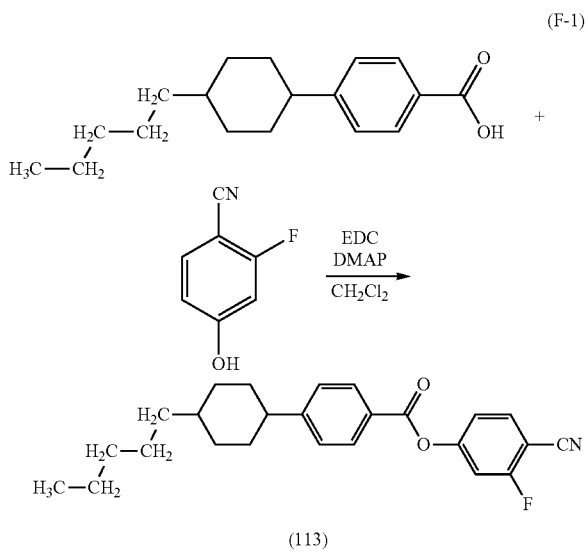

(113)

Into a 50-mL recovery flask were put 2.2 g (8.0 mmol) of 4-(trans-4-n-pentylcyclohexyl)benzoic acid, 1.1 g (8.0 mmol) of 2-fluoro-4-hydroxybenzonitrile, 0.15 g (1.2 mmol) of 4-(N,N-dimethylamino)pyridine (DMAP), and 8.0 mL of dichloromethane, and stirring was performed. To this mixture, 1.7 g (8.9 mmol) of 1-ethyl-3-(3-dimethylaminopropyl) carbodiimide hydrochroride (EDC) was added, and stirring was performed in the air at room temperature for 28 hours. After a predetermined time, water was added to the obtained mixture, and an aqueous layer was extracted with dichloromethane. The obtained extracted solution and an organic layer were combined, and the mixture was washed with saturated saline and then dried with magnesium sulfate. This mixture was separated by gravity filtration, and the filtrate was concentrated to give a solid. This solid was purified by silica gel column chromatography (developing solvent: toluene). The obtained fraction was concentrated to give a white solid. This solid was purified by high performance liquid chromatography (HPLC) (developing solvent: chloroform). The obtained fraction was concentrated to give 2.5 g of a white solid, which was the substance to be produced, in a yield of 81%.

Then, 2.5 g of the obtained white solid was purified by a train sublimation method. In the purification by sublimation, the white solid was heated at 155° C. under a pressure of 2.5 Pa with a flow rate of argon gas of 5 mL/min. After the purification by sublimation, 2.1 g of a white solid was obtained in a collection rate of 84%.

This compound was identified as 4-cyano-3-fluorophenyl 4-(trans-4-n-pentylcyclohexyl)benzoate (abbreviation: CPEP-5CNF), which was the substance to be produced, by nuclear magnetic resonance (NMR) spectroscopy.

Figure 12A:
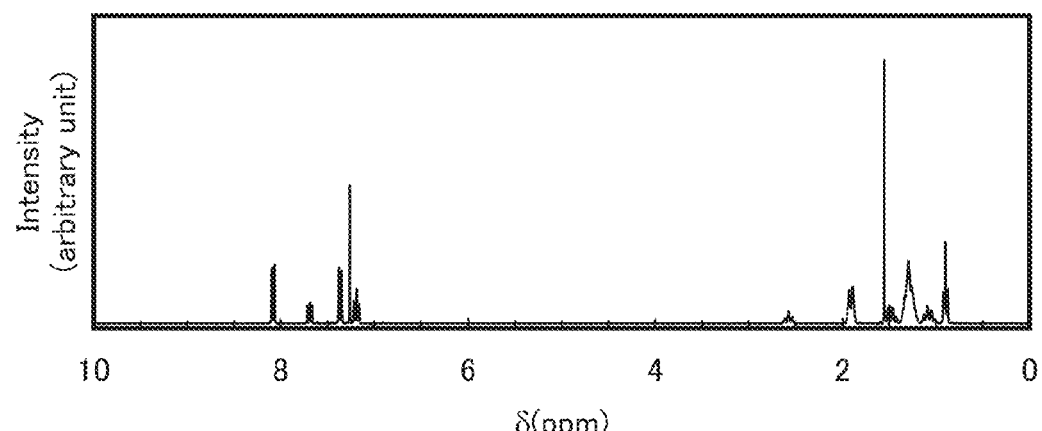
FIGS. 12A to 12C are $^1$H NMR charts of CPEP-5CNF.
Figure 12B:
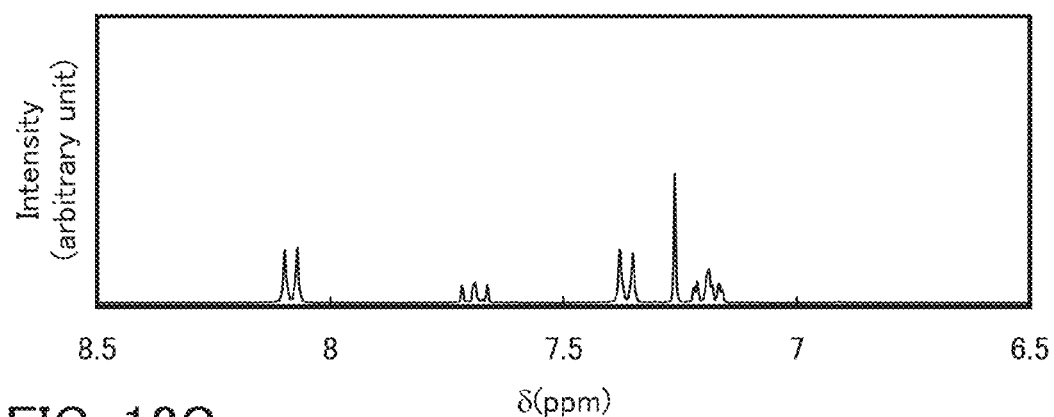
Figure 12C:
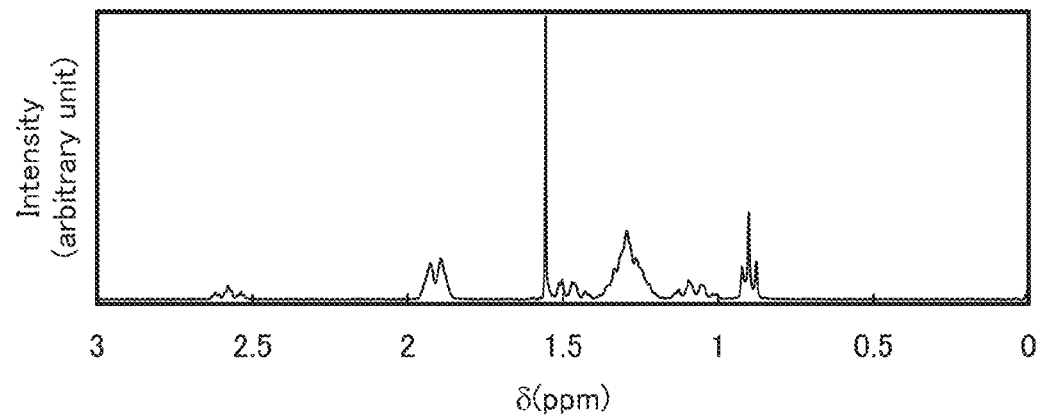

The ¹H NMR data of the obtained substance (CPEP-5CNF) is shown below. ¹H NMR (CDCl₃, 300 MHz): δ (ppm)=0.90 (t, 3H), 1.02-1.13 (m, 2H), 1.20-1.35 (m, 9H), 1.43-1.56 (m, 2H), 1.89-1.93 (m, 4H), 2.54-2.62 (m, 1H), 7.16-7.22 (m, 2H), 7.37 (d, 2H), 7.66-7.72 (m, 1H), 8.08 (d, 2H). In addition, FIGS. 12A to 12C are the ¹H-NMR charts. Note that 12B is a chart showing an enlarged part of FIG. 12A in a range of 6.5 ppm to 8.5 ppm. FIG. 12C is a chart showing an enlarged part of FIG. 12A in a range of 0.0 ppm to 3.0 ppm.

Synthesis Method of 4-cyano-3-fluorophenyl 4-n-propylbenzoate (abbreviation: PEP-3 CNF)

A synthesis scheme of PEP-3CNF represented by the structural formula (114) is shown in (G1) below.

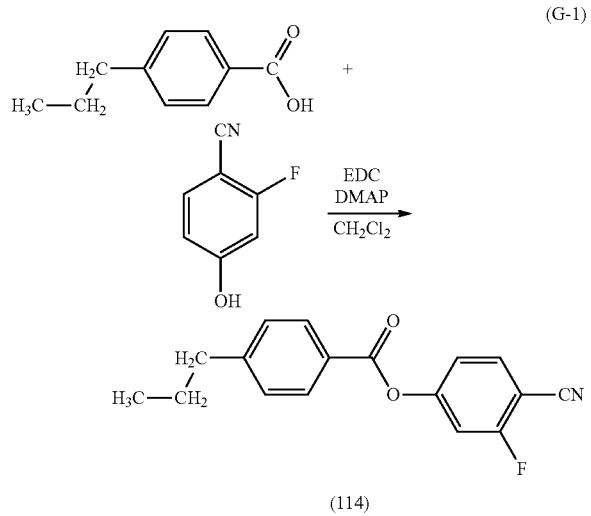

(G-1)

(114)

Into a 50-mL recovery flask were put 1.7 g (10.6 mmol) of 4-n-propylbenzoic acid, 1.5 g (10.6 mmol) of 2-fluoro-4-hydroxybenzonitrile, 195 mg (1.6 mmol) of (4-N,N-dimethylamino)pyridine (DMAP), and 10.6 mL of dichloromethane, and stirring was performed. To this mixture, 2.2 g (11.7 mmol) of 1-ethyl-3-(3-dimethylaminopropyl)carbodiimide hydrochroride (EDC) was added, and stirring was performed in the air at room temperature for 15 hours. After a predetermined time, water was added to the obtained mixture to extract an aqueous layer with dichloromethane. The obtained extracted solution and an organic layer were combined and washed with a saturated aqueous solution of sodium hydrogen carbonate and saturated saline, and then, the organic layer was dried with magnesium sulfate. This mixture was separated by gravity filtration, and the filtrate was concentrated to give a colorless oily substance. This oily substance was purified by silica gel column chromatography (developing solvent: toluene). The obtained fraction was concentrated to give a colorless oily substance. This oily substance was purified by high performance liquid chromatography (HPLC) (developing solvent: chloroform). The obtained fraction was concentrated to give 2.47 g of a colorless oily substance, which was the substance to be produced, in a yield of 82%.

Then, the obtained colorless oily substance was purified by sublimation using a train sublimation method. In the purification by sublimation, the colorless oily substance was heated at 150° C. under a pressure of 2.0 Pa with a flow rate of argon gas of 10 mL/min. After the purification by sublimation, 0.78 g of the colorless oily substance was obtained in a collection rate of 26%.

This compound was identified as 4-cyano-3-fluorophenyl 4-n-propylbenzoate (abbreviation: PEP-3CNF), which was the substance to be produced, by nuclear magnetic resonance (NMR) spectroscopy.

Figure 13A:
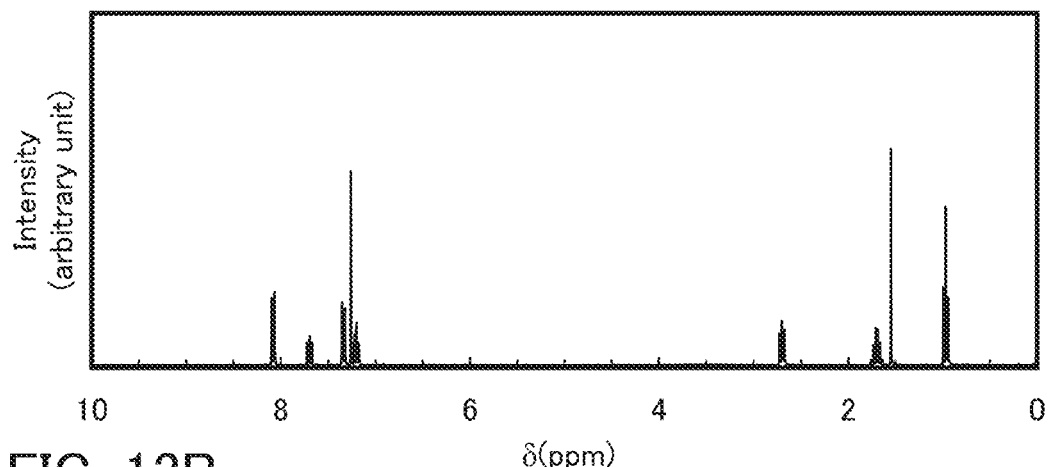
FIGS. 13A to 13C are $^1$H NMR charts of PEP-3CNF.
Figure 13B:
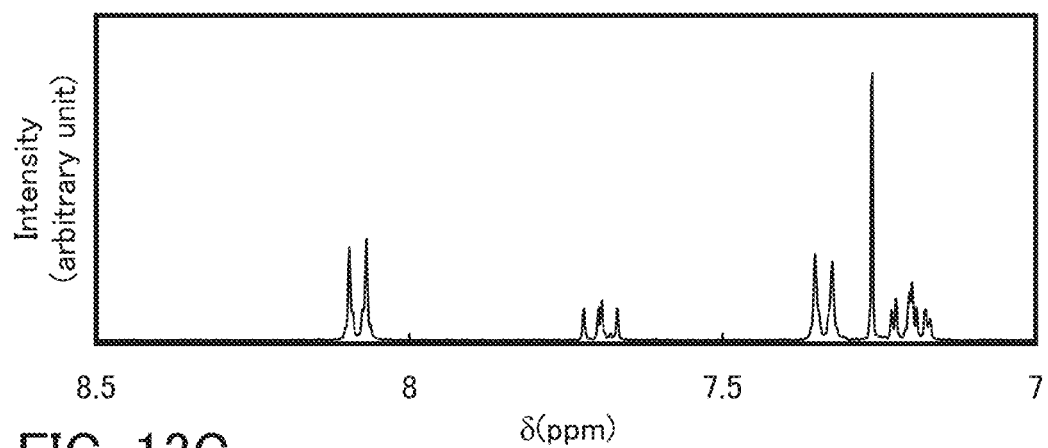
Figure 13C:
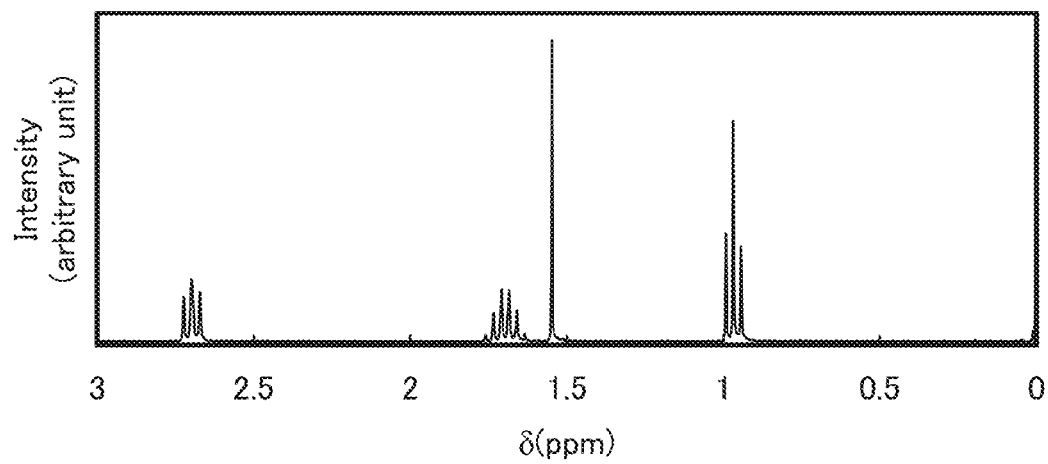

The ¹H NMR data of the obtained substance (PEP-3CNF) is shown below. ¹H NMR (CDCl₃, 300 MHz): δ (ppm)=0.97 (t, 3H), 1.63-1.76 (m, 2H), 2.70 (t, 2H), 7.17-7.23 (m, 2H), 7.34 (d, 2H), 7.67-7.72 (m, 1H), 8.08 (d, 2H). In addition, FIGS. 13A to 13C are ¹H NMR charts. Note that FIG. 13B is an enlarged chart showing the range of 7.0 ppm to 8.5 ppm in FIG. 13A. Note also that FIG. 13C is an enlarged chart showing the range of 0.0 ppm to 3.0 ppm in FIG. 13A.

This application is based on Japanese Patent Application serial no. 2010-263468 filed with the Japan Patent Office on Nov. 26, 2010, the entire contents of which are hereby incorporated by reference.

What is claimed is:
1. A liquid crystal composition comprising:
a chiral agent; and
a liquid crystal comprising a plurality of rings including at least one aromatic ring, which are linked to each other directly or with a linking group,
wherein the aromatic ring has three electron-withdrawing groups as end groups,
wherein each of the electron-withdrawing groups is a trifluoromethyl group, fluorine, bromine, chlorine, iodine, a cyano group, a trifluoromethylsulfonyl group, a nitro group, an isothiocyanate group, a thiocyanato group, or a pentafluorosulfanyl group,
wherein the linking group is represented by any of structural formulae (1) to (4) and (6) to (24),
wherein at least one of the three electron-withdrawing groups includes a trifluoromethyl group, and
wherein at least one of the three electron-withdrawing groups is a cyano group

(1)

(2)

(3)

(4)

(6)

(7)

(8)

(9)

(10)

-continued

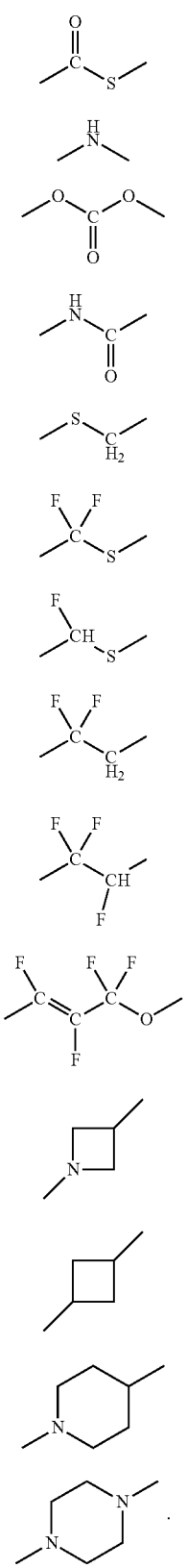

2. The liquid crystal composition according to claim 1, wherein the plurality of rings includes a cycloalkane.

3. The liquid crystal composition according to claim 1, wherein the aromatic ring is a benzene ring.

4. The liquid crystal composition according to claim 1, wherein at least one of the three electron-withdrawing groups is fluorine.

5. The liquid crystal composition according to claim 1, wherein the chiral agent is contained at 10 wt % or less.

6. A liquid crystal display device comprising the liquid crystal composition according to claim 1.

7. The liquid crystal display device according to claim 6, wherein the liquid crystal composition further includes an organic resin.

8. The liquid crystal display device according to claim 6, wherein a peak of a diffracted wavelength on a longest wavelength side in a reflectance spectrum of the liquid crystal composition is less than or equal to 450 nm.

9. A liquid crystal composition comprising a compound represented by a structural formula (150),
wherein the liquid crystal composition exhibits a blue phase

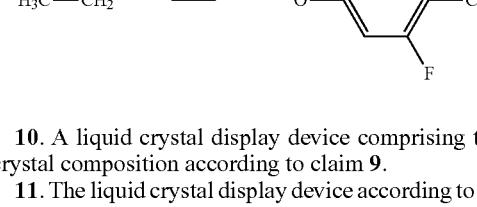

10. A liquid crystal display device comprising the liquid crystal composition according to claim 9.

11. The liquid crystal display device according to claim 10, wherein the liquid crystal composition further comprises a chiral agent.

12. The liquid crystal display device according to claim 11, wherein the chiral agent is contained at 10 wt % or less.

13. The liquid crystal display device according to claim 10, wherein the liquid crystal composition further includes an organic resin.

14. The liquid crystal display device according to claim 10, wherein a peak of a diffracted wavelength on a longest wavelength side in a reflectance spectrum of the liquid crystal composition is less than or equal to 450 nm.

15. The liquid crystal composition according to claim 1, wherein the liquid crystal composition exhibits a blue phase.

16. The liquid crystal composition according to claim 1, wherein a peak of a diffracted wavelength on a longest wavelength side in a reflectance spectrum of the liquid crystal composition is less than or equal to 450 nm.

17. The liquid crystal composition according to claim 9, wherein a peak of a diffracted wavelength on a longest wavelength side in a reflectance spectrum of the liquid crystal composition is less than or equal to 450 nm.

18. A liquid crystal composition comprising:
a chiral agent; and
a liquid crystal comprising a plurality of rings including at least one aromatic ring, which are linked to each other directly or with a linking group,
wherein the aromatic ring has three electron-withdrawing groups as end groups,
wherein each of the electron-withdrawing groups is a trifluoromethyl group, fluorine, bromine, chlorine, iodine, a cyano group, a trifluoromethylsulfonyl group, a nitro group, an isothiocyanate group, a thiocyanato group, or a pentafluorosulfanyl group, wherein the linking group is represented by any of structural formulae (1) to (4) and (6) to (24), wherein at least one of the three electron-withdrawing groups includes a trifluoromethyl group, wherein the liquid crystal composition exhibits a blue phase, and wherein a peak of a diffracted wavelength on a longest wavelength side in a reflectance spectrum of the liquid is less than or equal to 450 nm

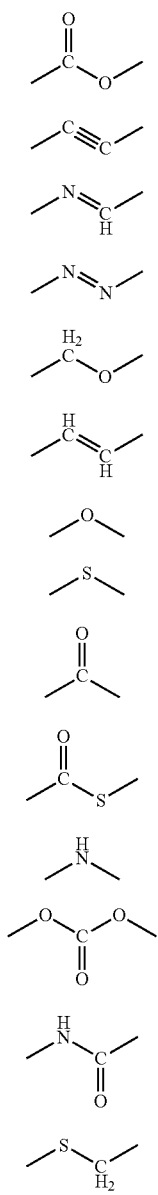

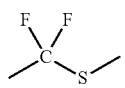

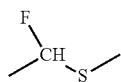

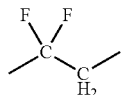

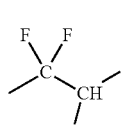

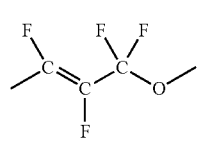

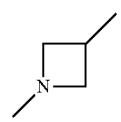

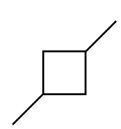

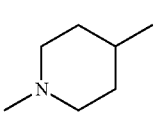

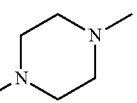

19. The liquid crystal composition according to claim 18, wherein the plurality of rings includes a cycloalkane.

20. The liquid crystal composition according to claim 18, wherein the aromatic ring is a benzene ring.

21. The liquid crystal composition according to claim 18, wherein at least one of the three electron-withdrawing groups is fluorine.

22. The liquid crystal composition according to claim 18, wherein the chiral agent is contained at 10 wt % or less.

23. A liquid crystal display device comprising the liquid crystal composition according to claim 18.

24. The liquid crystal display device according to claim 23, wherein the liquid crystal composition includes an organic resin.

* * * * *